United States Patent
Sano et al.

(10) Patent No.: US 10,745,775 B2
(45) Date of Patent: Aug. 18, 2020

(54) GALVANNEALED STEEL SHEET AND METHOD FOR PRODUCING THE SAME

(71) Applicant: NIPPON STEEL & SUMITOMO METAL CORPORATION, Tokyo (JP)

(72) Inventors: Kohichi Sano, Tokyo (JP); Jun Haga, Tokyo (JP); Koutarou Hayashi, Tokyo (JP); Hiroyuki Kawata, Tokyo (JP); Riki Okamoto, Tokyo (JP); Akihiro Uenishi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 289 days.

(21) Appl. No.: 15/580,002

(22) PCT Filed: Jun. 10, 2016

(86) PCT No.: PCT/JP2016/067448
§ 371 (c)(1),
(2) Date: Dec. 6, 2017

(87) PCT Pub. No.: WO2016/199922
PCT Pub. Date: Dec. 15, 2016

(65) Prior Publication Data
US 2018/0298462 A1 Oct. 18, 2018

(30) Foreign Application Priority Data

Jun. 11, 2015 (JP) .................................. 2015-118648
Jul. 8, 2015 (JP) .................................. 2015-137052
Jul. 8, 2015 (JP) .................................. 2015-137192

(51) Int. Cl.
*C21D 8/02* (2006.01)
*C21D 9/46* (2006.01)
(Continued)

(52) U.S. Cl.
CPC .............. *C21D 9/46* (2013.01); *B32B 15/00* (2013.01); *B32B 15/01* (2013.01); *B32B 15/013* (2013.01); *B32B 15/04* (2013.01); *B32B 15/043* (2013.01); *B32B 15/18* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0247* (2013.01); *C21D 8/0263* (2013.01); *C21D 8/0278* (2013.01); *C22C 18/00* (2013.01); *C22C 38/00* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/105* (2013.01); *C22C 38/12* (2013.01); *C22C 38/14* (2013.01); *C22C 38/16* (2013.01); *C22C 38/18* (2013.01); *C22C 38/20* (2013.01);
(Continued)

(58) Field of Classification Search
CPC ...... C21D 9/46; C21D 8/0278; C21D 8/0263; C21D 8/0247; C21D 8/0205; C21D 8/0236; C21D 8/0226; C21D 6/008; C21D 6/005; C21D 6/004; C21D 2211/001; C21D 2211/002; C21D 2211/008; C23C 2/06; C23C 2/40; C23C 2/02; C23C 2/028; C23C 2/04; C23C 2/26; C23C 30/00; C23C 30/005; C23C 2/28; C22C 38/04; C22C 38/00; C22C 38/58; C22C 38/50; C22C 38/42; C22C 38/32; C22C 38/26; C22C 38/24; C22C 38/22; C22C 38/005; C22C 38/002; C22C 38/06; C22C 38/02; C22C 38/001; C22C 38/008; C22C 38/08; C22C 38/105; C22C 38/12; C22C 38/14; C22C 38/20; C22C 38/16; C22C 38/18; C22C 38/28; C22C 38/30; C22C 38/40; C22C 38/44; C22C 38/46; C22C 38/48; C22C 38/52; C22C 38/54; C22C 38/60; C22C 18/00; B32B 15/00; B32B 15/01; B32B 15/013; B32B 15/04; B32B 15/043; B32B 15/18; Y10T 428/12799; Y10T 428/12958; Y10T 428/12965; Y10T 428/12972; Y10T 428/12979; Y10T 428/24942; Y10T 428/2495; Y10T 428/24967; Y10T 428/24983; Y10T 428/263; Y10T 428/264; Y10T 428/265
See application file for complete search history.

(56) References Cited

FOREIGN PATENT DOCUMENTS

| CN | 102149841 | 8/2011 |
|---|---|---|
| CN | 103827336 | 5/2014 |

(Continued)

*Primary Examiner* — Michael E. La Villa
(74) *Attorney, Agent, or Firm* — Clark & Brody LP

(57) ABSTRACT

A steel sheet for galvannealed steel contains, by mass %, C: 0.25 to 0.70%, Si: 0.25 to 2.50%, Mn: 1.00 to 5.00%, Al: 0.005 to 3.50%, P: 0.15% or less, S: 0.03% or less, N £ 0.02%, O £ 0.01%, and optionally one or more selected from Ti, Nb, V, Cr, Mo, Cu, Ni, B, Ca, REM, Mg, W, Zr, Sb, Sn, As, Te, Y, Hf and Co, a balance being Fe and impurities. The microstructure consists of, by vol. %, retained g: 10.0 to 60.0%, high-temperature tempered martensite³ 5.0%, low-temperature tempered martensite³ 5.0%, fresh martensite £ 10.0%, a: 0 to 15.0%, P: 0 to 10.0%, a balance being bainite. Total volume ratio of tempered martensite and bainite is 30.0% or more, tensile strength is 1470 MPa or more, tensile strength×uniform elongation is 13000 MPa % or more, and tensile strength×local elongation is 5000 MPa % or more.

18 Claims, No Drawings

(51) Int. Cl.

| | | |
|---|---|---|
| *C21D 6/00* | (2006.01) | |
| *C22C 38/58* | (2006.01) | |
| *C22C 38/50* | (2006.01) | |
| *C22C 38/42* | (2006.01) | |
| *C22C 38/32* | (2006.01) | |
| *C22C 38/26* | (2006.01) | |
| *C22C 38/24* | (2006.01) | |
| *C22C 38/22* | (2006.01) | |
| *C22C 38/06* | (2006.01) | |
| *C22C 38/02* | (2006.01) | |
| *C22C 38/00* | (2006.01) | |
| *C23C 2/28* | (2006.01) | |
| *C22C 18/00* | (2006.01) | |
| *C22C 38/60* | (2006.01) | |
| *C23C 2/02* | (2006.01) | |
| *C22C 38/04* | (2006.01) | |
| *C23C 2/40* | (2006.01) | |
| *C23C 2/06* | (2006.01) | |
| *C22C 38/10* | (2006.01) | |
| *C22C 38/12* | (2006.01) | |
| *C22C 38/14* | (2006.01) | |
| *C22C 38/40* | (2006.01) | |
| *C22C 38/46* | (2006.01) | |
| *C22C 38/20* | (2006.01) | |
| *C22C 38/08* | (2006.01) | |
| *C22C 38/28* | (2006.01) | |
| *C22C 38/30* | (2006.01) | |
| *C22C 38/52* | (2006.01) | |
| *C22C 38/48* | (2006.01) | |
| *C22C 38/44* | (2006.01) | |
| *C22C 38/18* | (2006.01) | |
| *C22C 38/16* | (2006.01) | |
| *C22C 38/54* | (2006.01) | |
| *B32B 15/01* | (2006.01) | |
| *B32B 15/04* | (2006.01) | |
| *B32B 15/00* | (2006.01) | |
| *B32B 15/18* | (2006.01) | |
| *C23C 2/04* | (2006.01) | |
| *C23C 30/00* | (2006.01) | |
| *C23C 2/26* | (2006.01) | |

(52) U.S. Cl.

CPC .............. *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *C22C 38/60* (2013.01); *C23C 2/02* (2013.01); *C23C 2/04* (2013.01); *C23C 2/06* (2013.01); *C23C 2/26* (2013.01); *C23C 2/28* (2013.01); *C23C 2/40* (2013.01); *C23C 30/00* (2013.01); *C23C 30/005* (2013.01); *C21D 2211/001* (2013.01); *C21D 2211/002* (2013.01); *C21D 2211/008* (2013.01); *Y10T 428/12799* (2015.01); *Y10T 428/12958* (2015.01); *Y10T 428/12965* (2015.01); *Y10T 428/12972* (2015.01); *Y10T 428/12979* (2015.01); *Y10T 428/2495* (2015.01); *Y10T 428/24942* (2015.01); *Y10T 428/24967* (2015.01); *Y10T 428/24983* (2015.01); *Y10T 428/263* (2015.01); *Y10T 428/264* (2015.01); *Y10T 428/265* (2015.01)

(56) References Cited

FOREIGN PATENT DOCUMENTS

| | | |
|---|---|---|
| CN | 103842542 | 6/2014 |
| EP | 2 327 810 | 6/2011 |
| EP | 2 762 592 | 8/2014 |
| EP | 2 762 600 | 8/2014 |
| JP | 11-279691 | 10/1999 |
| JP | 2010-065272 | 3/2010 |
| JP | 2011-168816 | 9/2011 |
| JP | 2014-508854 | 4/2014 |
| JP | 2015-078394 | 4/2015 |
| JP | 2015-078398 | 4/2015 |
| TW | 201343934 | 11/2013 |
| WO | 2013/047755 | 4/2013 |
| WO | 2013/047830 | 4/2013 |
| WO | 2014/073520 | 5/2014 |

GALVANNEALED STEEL SHEET AND METHOD FOR PRODUCING THE SAME

TECHNICAL FIELD

The present invention relates to a galvannealed steel sheet and a method for producing the galvannealed steel sheet.

BACKGROUND ART

In recent years, reductions in the weight of automobile bodies are being sought with the aim of improving the fuel consumption of automobiles to contribute to protection of the global environment. In addition thereto, since it is necessary to ensure the safety of passengers, there is also a growing need for high-strength steel sheets. Recently, steel sheets having a tensile strength of 1470 MPa or more are also desired. However, a steel sheet to serve as a member for an automobile is required to not only have a high strength, but also to have favorable press-formability.

It is necessary to improve the ductility of a steel sheet in order to improve the press-formability thereof. However, tensile strength and ductility are elements that are contrary to each other, and it is usually difficult to improve both tensile strength and ductility at the same time. In addition, members for automobiles are required to have corrosion resistance and also continuous spot weldability with respect to spot welding. Therefore, it is necessary to achieve high strength and favorable press-formability by using a galvannealed steel sheet.

A steel sheet that utilizes a TRIP effect of retained austenite is known as a steel sheet having favorable uniform elongation while also having a high strength. For example, Patent Document 1 discloses a high-strength galvannealed steel sheet having good workability and a method for producing the high-strength galvannealed steel sheet.

Patent Document 2 discloses a high-strength galvannealed steel sheet having a tensile strength of 590 MPa or more that includes an alloyed hot-dip galvanized layer that is excellent with respect to wettability of plating and adhesion of a plated layer, and a method for producing the high-strength galvannealed steel sheet.

Patent Document 3 discloses a high-strength galvannealed steel sheet having excellent workability and corrosion resistance, and a method for producing the high-strength galvannealed steel sheet. In addition, Patent Document 4 discloses a steel sheet for molding members that has ultra-high strength which is achieved by heat treatment and also having excellent ductility, as well as a molding member and a method for producing the steel sheet.

LIST OF PRIOR ART DOCUMENTS

Patent Documents

Patent Document 1: JP11-279691A
Patent Document 2: WO2014/073520
Patent Document 3: JP2011-168816A
Patent Document 4: JP2014-508854A

SUMMARY OF INVENTION

Technical Problem

In Patent Document 1, it is described that by optimizing the ratio of C, Si, and Mn, even if re-heating for an alloying treatment is performed, a galvannealed steel sheet having a high strength and excellent in press workability is obtained.

In this connection, it is necessary for a TRIP steel sheet to contain Si in order to cause austenite to be retained. However, the Si significantly hinders plating properties, particularly, alloying for galvanization. Because the assumed strength level according to the technique described in Patent Document 1 is 880 MPa or less, a C content is a low amount of 0.15% by mass or less. If the C content is increased, because alloying is suppressed, it is difficult to compatibly achieve a balance between strength and elongation while promoting alloying.

As technology for promoting alloying in a TRIP steel sheet, as described in Patent Document 2, it is known to control the atmosphere during annealing prior to plating. According to this technology, because oxides of Si are formed inside a steel sheet and not on the surface of the steel sheet, it is easy for alloying of zinc and iron to proceed.

The technology described in Patent Document 2 relates to steel in which the C content is a comparatively low content of less than 0.3% by mass, and in order to achieve an additional increase in the steel strength it is necessary to make the C content 0.3% by mass or more. However, if the C content is made 0.3% by mass or more it will become difficult for alloying to proceed, and therefore even if the technology described in Patent Document 2 is adopted, it is difficult to secure retained austenite and also cause alloying to proceed sufficiently.

On the other hand, in Patent Document 3 a method is described that, for a TRIP steel sheet, suppresses decomposition of retained austenite during reheating that accompanies an alloying treatment. According to the method described in Patent Document 3, austenite can be secured by making a C amount in austenite prior to an alloying treatment low, and lowering a driving force with which carbides are generated from austenite.

However, in the case of the method described in Patent Document 3, because the C amount in the retained austenite is low and the austenite becomes unstable, local elongation tends to decrease. In particular, in the case of high-strength steel having a tensile strength of 1470 MPa or more, it is preferable to raise local elongation by even a small amount in addition to uniform elongation, and therefore the method described in Patent Document 3 cannot be adopted.

According to the method described in Patent Document 4, by subjecting steel to pressing after heating, and thereafter performing a heat treatment, TRIP steel is produced that is mainly composed of tempered martensite and also contains retained austenite, and which achieves both high strength and high ductility.

However, according to the method described in Patent Document 4, because zinc melts during heating, the method cannot be implemented on a continuous annealing line, and therefore cannot be employed for large-scale production. In addition, according to the method described in Patent Document 4, because the tempering temperature is less than 480° C., it is estimated that almost no alloying of plating occurs.

As described in the foregoing, in the above prior art there remains room for improvement with respect to obtaining a galvannealed steel sheet having high strength and ductility while adequately promoting alloying.

The present invention has been made to solve the problems described above, and an objective of the present invention is to provide a galvannealed steel sheet that is excellent in uniform deformability (uniform elongation) and local deformability (local elongation), and a method for producing the galvannealed steel sheet.

Solution to Problem

The present invention was conceived to solve the issues described above, and the gist of the present invention is a galvannealed steel sheet and a method for producing the galvannealed steel sheet which are described hereunder.

(1) A galvannealed steel sheet including an alloyed hot-dip galvanized layer on a surface of a steel sheet, a chemical composition of the steel sheet consisting of, by mass %, C: 0.25 to 0.70%,
Si: 0.25 to 2.50%,
Mn: 1.00 to 5.00%,
Al: 0.005 to 3.50%,
P: 0.15% or less,
S: 0.03% or less,
N: 0.02% or less,
O: 0.01% or less,
Ti: 0 to 0.50%,
Nb: 0 to 0.50%,
V: 0 to 0.50%,
Cr: 0 to 1.50%,
Mo: 0 to 1.50%,
Cu: 0 to 5.00%,
Ni: 0 to 5.00%,
B: 0 to 0.003%,
Ca: 0 to 0.05%,
REM: 0 to 0.05%,
Mg: 0 to 0.05%,
W: 0 to 0.50%,
Zr: 0 to 0.05%,
Sb: 0 to 0.50%,
Sn: 0 to 0.50%,
As: 0 to 0.05%,
Te: 0 to 0.05%,
Y: 0 to 0.20%,
Hf: 0 to 0.20%,
Co: 0 to 1.00%, and
a balance: Fe and impurities,
wherein:

a steel micro-structure at a position of ¼ thickness of a sheet thickness is, by vol. %, retained austenite: 10.0 to 60.0%,
high-temperature tempered martensite: 5.0% or more,
low-temperature tempered martensite: 5.0% or more,
fresh martensite: 10.0% or less,
ferrite: 0 to 15.0%,
pearlite: 0 to 10.0%, and
a balance: bainite; and a total volume ratio of high-temperature tempered martensite, low-temperature tempered martensite and bainite is 30.0% or more, a tensile strength is 1470 MPa or more, a product of the tensile strength and uniform elongation is 13000 MPa % or more, and a product of the tensile strength and local elongation is 5000 MPa % or more.

(2) The galvannealed steel sheet set forth in (1) above, wherein:

the chemical composition contains, by mass %,
Si+Al: 0.80% or more.

(3) The galvannealed steel sheet set forth in (1) or (2) above, wherein:

the chemical composition contains, by mass %, one or more elements selected from:

Ti: 0.005 to 0.50%,
Nb: 0.005 to 0.50%,
V: 0.005 to 0.50%,
Cr: 0.01 to 1.50%,
Mo: 0.01 to 1.50%,
Cu: 0.01 to 5.00%,
Ni: 0.01 to 5.00%,
B: 0.0001 to 0.003%,
Ca: 0.0001 to 0.05%,
REM: 0.0005 to 0.05%,
Mg: 0.0001 to 0.05%,
W: 0.005 to 0.50%,
Zr: 0.005 to 0.05%,
Sb: 0.005 to 0.50%,
Sn: 0.005 to 0.50%,
As: 0.005 to 0.05%,
Te: 0.001 to 0.05%,
Y: 0.001 to 0.20%,
Hf: 0.001 to 0.20%, and
Co: 0.001 to 1.00%.

(4) The galvannealed steel sheet set forth in any one of (1) to (3) above, wherein:

a C amount contained in the retained austenite is 0.85% by mass or more.

(5) The galvannealed steel sheet set forth in any one of (1) to (4) above, wherein:

an Fe amount contained in the alloyed hot-dip galvanized layer is 3.0 to 20.0% by mass.

(6) The galvannealed steel sheet set forth in any one of (1) to (5) above, wherein:

the steel sheet includes, in an outer layer, a surface soft layer having a hardness that is not more than 0.9 times an average hardness in a region from a position of ¼ thickness of the sheet thickness to a position of ½ thickness of the sheet thickness; and a thickness of the surface soft layer from an interface between the alloyed hot-dip galvanized layer and the steel sheet is more than 10 μm.

(7) The galvannealed steel sheet set forth in any one of (1) to (5) above, wherein:

the steel sheet includes, in an outer layer, a surface soft layer having a hardness that is not more than 0.9 times an average hardness in a region from a position of 114 thickness of the sheet thickness to a position of ½ thickness of the sheet thickness;

a thickness of the surface soft layer from an interface between the alloyed hot-dip galvanized layer and the steel sheet is 10 μm or less; and a ratio of a fatigue limit to a tensile strength of the steel sheet is 0.30 or more.

(8) A method for producing a galvannealed steel sheet, that is a method for producing a galvannealed steel sheet set forth in any one of (1) to (5) above, including:

(a) a melting step of melting an ingot or a slab having a chemical composition according to any one of (1) to (3) above;

(b) a hot-rolling step of heating the ingot or slab and performing hot-rolling to obtain a hot-rolled steel sheet;

(c) a first cooling step of cooling the hot-rolled steel sheet;

(d) a coiling step of coiling the hot-rolled steel sheet;

(e) a cold-rolling step of uncoiling and pickling the hot-rolled steel sheet, and thereafter performing cold rolling to obtain a cold-rolled steel sheet;

(f) an annealing step of maintaining the cold-rolled steel sheet in a temperature range from an $Ac_1$ point to 920° C. for 5 s or more;

(g) a second cooling step of cooling the cold-rolled steel sheet to a temperature range of 100 to 600° C. at an average cooling rate of 1° C./s or more;

(h) a pre-treatment step of cooling or heating the cold-rolled steel sheet to a hot-dip galvanizing bath temperature;

(i) a plating step of immersing the cold-rolled steel sheet in a hot-dip galvanizing bath such that the steel sheet is hot-dip galvanized to obtain a hot-dip galvanized steel sheet;

(j) an alloying step of heating the hot-dip galvanized steel sheet to 480 to 600° C. such that the hot-dip galvanized steel sheet is alloyed to obtain a galvannealed steel sheet;

(k) a third cooling step of cooling the galvannealed steel sheet to a temperature range of 80 to 300° C. at an average cooling rate of 1° C./s or more; and (l) a tempering step of maintaining the galvannealed steel sheet in a temperature range from 100 to 450° C. for 1 s or more and 48 h or less;

wherein the steps from (a) to (l) described above are carried out in sequence.

(9) A method for producing a galvannealed steel sheet, that is a method for producing a galvannealed steel sheet set forth in (6) above, including:

(a) a melting step of melting an ingot or a slab having a chemical composition according to any one of (1) to (3) above;

(b) a hot-rolling step of heating the ingot or slab and performing hot-rolling to obtain a hot-rolled steel sheet;

(c) a first cooling step of cooling the hot-rolled steel sheet;

(d) a coiling step of coiling the hot-rolled steel sheet;

(e) a cold-rolling step of uncoiling and pickling the hot-rolled steel sheet, and thereafter performing cold rolling to obtain a cold-rolled steel sheet;

(f) an annealing step of maintaining the cold-rolled steel sheet in a temperature range from an $Ac_1$ point to 920° C. for 5 s or more in an atmosphere with a dew point of −25° C. or more;

(g) a second cooling step of cooling the cold-rolled steel sheet to a temperature range of 100 to 600° C. at an average cooling rate of 1° C./s or more;

(h) a pre-treatment step of cooling or heating the cold-rolled steel sheet to a hot-dip galvanizing bath temperature;

(i) a plating step of immersing the cold-rolled steel sheet in a hot-dip galvanizing bath such that the steel sheet is hot-dip galvanized to obtain a hot-dip galvanized steel sheet;

(j) an alloying step of heating the hot-dip galvanized steel sheet to 480 to 600° C. such that the hot-dip galvanized steel sheet is alloyed to obtain a galvannealed steel sheet;

(k) a third cooling step of cooling the galvannealed steel sheet to a temperature range of 80 to 300° C. at an average cooling rate of 1° C./s or more; and (l) a tempering step of maintaining the galvannealed steel sheet in a temperature range from 100 to 450° C. for 1 s or more and 48 h or less;

wherein the steps from (a) to (l) described above are carried out in sequence.

(10) A method for producing a galvannealed steel sheet, that is a method for producing a galvannealed steel sheet set forth in (7) above, including:

(a) a melting step of melting an ingot or a slab having a chemical composition according to any one of (1) to (3) above;

(b) a hot-rolling step of heating the ingot or slab and performing hot-rolling to obtain a hot-rolled steel sheet;

(c) a first cooling step of cooling the hot-rolled steel sheet;

(d) a coiling step of coiling the hot-rolled steel sheet;

(e) a cold-rolling step of uncoiling and pickling the hot-rolled steel sheet, and thereafter performing cold rolling to obtain a cold-rolled steel sheet;

(f) an annealing step of maintaining the cold-rolled steel sheet in a temperature range from an $Ac_1$ point to 920° C. for 5 s or more in an atmosphere with a dew point of −15° C. or less;

(g) a second cooling step of cooling the cold-rolled steel sheet to a temperature range of 100 to 600° C. at an average cooling rate of 1° C./s or more;

(h) a pre-treatment step of cooling or heating the cold-rolled steel sheet to a hot-dip galvanizing bath temperature;

(i) a plating step of immersing the cold-rolled steel sheet in a hot-dip galvanizing bath such that the steel sheet is hot-dip galvanized to obtain a hot-dip galvanized steel sheet;

(j) an alloying step of heating the hot-dip galvanized steel sheet to 480 to 600° C. such that the hot-dip galvanized steel sheet is alloyed to obtain a galvannealed steel sheet;

(k) a third cooling step of cooling the galvannealed steel sheet to a temperature range of 80 to 300° C. at an average cooling rate of 1° C./s or more; and (l) a tempering step of maintaining the galvannealed steel sheet in a temperature range from 100 to 450° C. for 1 s or more and 48 h or less;

wherein the steps from (a) to (l) described above are carried out in sequence.

Advantageous Effects of Invention

According to the present invention it is possible to obtain a galvannealed steel sheet that is excellent in uniform deformability (uniform elongation) and local deformability (local elongation) while having a high tensile strength of 1470 MPa or more.

DESCRIPTION OF EMBODIMENTS

The present inventors conducted intensive studies with respect to a method for obtaining a galvannealed steel sheet that has high strength and is excellent in ductility while also causing alloying to progress sufficiently, and as a result obtained the findings described hereunder.

As described in the foregoing, because securing retained austenite and sufficient alloying progress are mutually contradictory, it is difficult to produce alloyed hot-dip galvanized steel having both high strength and ductility. The present inventors performed a fundamental reappraisal regarding a method for obtaining a galvannealed steel sheet having sufficient elongation and a tensile strength of 1470 MPa or more.

As a result, the present inventors succeeded in obtaining a galvannealed steel sheet having high-strength and high ductility in which, having a C content of 0.3% by mass or more in the steel sheet, retained austenite is 10 vol. % or more, tensile strength is 1470 MPa or more, a product of tensile strength and uniform elongation is 13000 MPa % or more, and a product of tensile strength and local elongation is 5000 MPa % or more.

The method for obtaining the galvannealed steel sheet will now be described. It is customary practice to perform galvanization after forming the steel micro-structure of a steel sheet. Therefore, when manufacturing TRIP steel, C is caused to concentrate in austenite before a plating treatment. However, after performing galvanization, if the temperature is raised for the purpose of an alloying treatment, carbides precipitate at 500° C. or higher.

Therefore, the present inventors decided not to cause C to concentrate in austenite at the stage of the alloying treatment. In addition, after the alloying treatment, the present inventors added a heat treatment for the purpose of promoting transformation. The present inventors discovered that, by means of the heat treatment, C is caused to concentrate in austenite, and TRIP steel containing stable retained austenite can be obtained.

In addition, the present inventors discovered that in order to obtain high ductility while also having a high tensile strength of 1470 MPa or more, it is effective to cause high-temperature tempered martensite and low-temperature tempered martensite, which are described later, to be present at a predetermined volume ratio, respectively. Further, the present inventors discovered that, in order to cause high-temperature tempered martensite and low-temperature tempered martensite to be present at a predetermined volume ratio, respectively, it is effective to perform an annealing treatment under predetermined heating conditions and cooling conditions before an alloying treatment.

The present invention has been made based on the above findings. The respective requirements of the present invention are described in detail hereunder.

(A) Chemical Composition

The reasons for limiting each element are as follows. Note that, the symbol "%" with respect to content in the following description represents "mass percent".

C: 0.25 to 0.70%

C is an effective element for obtaining high strength. C is also an element that stabilizes retained austenite which contributes to enhancing the ductility of the steel sheet. If the C content is less than 0.25%, the aforementioned effects are not sufficiently exhibited, and it is difficult to obtain the necessary tensile strength (1470 MPa or more). On the other hand, if the C content is more than 0.70%, the steel sheet becomes too hard and cold rolling is difficult. Therefore the C content is made 0.25 to 0.70%.

Although tempered martensite and bainite that are described later are responsible for the strength of the steel sheet, if the C content is low, in some cases the micro-structure of the tempered martensite and bainite will become soft and the desired tensile strength will not be obtained. Therefore, the C content is preferably 0.28% or more, and more preferably is 0.30% or more. Further, the C content is preferably 0.60% or less, and more preferably is 0.50% or less.

Si: 0.25 to 2.50%

In addition to being an element that increases the strength of the steel sheet, Si also strengthens ferrite and uniformizes the micro-structure, and is thus an effective element for improving workability. Si is also an element that acts to suppress precipitation of cementite and promote retention of austenite.

If the Si content is less than 0.25%, the aforementioned effects are not sufficiently exhibited. On the other hand, if the Si content is more than 2.50%, toughness decreases significantly and production becomes difficult. Therefore, the Si content is made 0.25 to 2.50%. The Si content is preferably 0.30% or more, and more preferably is 0.60% or more. Further, the Si content is preferably 2.30% or less, and more preferably is 2.00% or less.

Mn: 1.00 to 5.00%

Mn is an element that causes the formation of M-A (martensite-austenite constituents), and is an essential element for compatibly achieving both strength and elongation. If the Mn content is less than 1.00%, the aforementioned effect is not sufficiently exhibited. On the other hand, if the Mn content is more than 5.00%, the progress of bainite transformation is slow, and C does not concentrate in austenite. As a result, the austenite is not stabilized, and ultimately the volume ratio of fresh martensite is excessive. Therefore, the Mn content is made 1.00 to 5.00%. The Mn content is preferably 1.20% or more, and more preferably is 1.50% or more. Further, the Mn content is preferably 4.5% or less, and more preferably is 4.00% or less.

Al: 0.005 to 3.50%

Al is a deoxidizing element and, similarly to Si, also suppresses precipitation of cementite, and is an effective element for increasing retained austenite. The aforementioned effects are not sufficiently exhibited if the Al content is less than 0.005%. On the other hand, if the Al content is more than 3.50%, inclusions increase and workability deteriorates. Therefore, the Al content is made 0.005 to 3.50%. The Al content is preferably 0.010% or more, and more preferably is 0.020% or more. Further, the Al content is preferably 3.30% or less, and more preferably is 3.00% or less.

Si+Al: 0.80% or More

Even if the respective contents of Si and Al satisfy the aforementioned ranges, if Si+Al is less than 0.80%, the synergetic effect of Si and Al will not be sufficient, and there is a concern that cementite will precipitate during bainite transformation and retained austenite will not stabilize. Consequently, in order to cause retained austenite to stabilize to a greater degree, the total content of Si and Al is preferably made 0.80% or more, more preferably is made 0.90% or more, and further preferably is 1.00% or more.

P: 0.15% or Less

P is an impurity element, and is an element that segregates and decreases the toughness. If the P content is more than 0.15%, the toughness noticeably decreases. Therefore, the P content is made 0.15% or less. The P content is preferably 0.12% or less, and more preferably is 0.10% or less. Note that, reducing the P content to less than 0.003% will cause a significant rise in the production cost. Therefore, 0.003% is the practical lower limit of the P content.

S: 0.03% or Less

S is an impurity element, and is an element that forms MnS and hinders elongation. If the S content is more than 0.03%, elongation noticeably decreases. Therefore, the S content is made 0.03% or less. The S content is preferably 0.02% or less, and more preferably is 0.01% or less. Note that, reducing the S content to less than 0.0002% will cause a significant rise in the production cost. Therefore, 0.0002% is the practical lower limit of the S content.

N: 0.02% or Less

N is an impurity element, and is an element that forms nitrides that are a cause of cracking in a slab during continuous casting. If the N content is more than 0.02%, cracking in the slab will be noticeable. Therefore, the N content is made 0.02% or less. The N content is preferably 0.01% or less. Note that, reducing the N content to less than 0.0007% will cause a significant rise in the production cost. Therefore, 0.0007% is the practical lower limit of the N content.

O: 0.01% or Less

O is an element that forms inclusions and inhibits local ductility and toughness. If the O content is more than 0.01%, the local ductility and toughness noticeably decrease. Therefore, the O content is made 0.01% or less. The O content is preferably 0.008% or less, and more preferably is 0.006% or less. Note that, reducing the O content to less than 0.0001% will cause a significant rise in the production cost. Therefore, 0.0001% is the practical lower limit of the O content.

In addition to the elements described above, the galvannealed steel sheet of the present invention may contain one or more elements selected from Ti, Nb, V, Cr, Mo, Cu, Ni, B, Ca, REM, Mg, W, Zr, Sb, Sn, As, Te, Y, Hf and Co in the amounts described hereunder.

Ti: 0 to 0.50%
Nb: 0 to 0.50%
V: 0 to 0.50%

Ti, Nb and V are elements that form precipitates and refine grains to thereby contribute to improving strength and toughness, and may therefore be contained according to need. However, if any of these elements is contained in an amount that is more than 0.50%, the aforementioned effects are saturated and the production cost increases. Therefore, the content of each of Ti, Nb and V is made 0.50% or less. The content of each of these elements is preferably 0.35% or less.

To obtain the aforementioned effects, it is preferable to contain one or more elements selected from Ti, Nb and V in an amount of 0.005% or more. Since Ti and Nb refine grains of austenite to thereby stabilize the austenite, it is more preferable to contain one or two types of element selected from Ti and Nb in an amount of 0.010% or more, and an amount of 0.030% or more is further preferable.

Cr: 0 to 1.50%
Mo: 0 to 1.50%

Cr and Mo, similarly to Mn, stabilize austenite and promote transformation strengthening, and are effective elements for enhancing the strength of the steel sheet. Further, Cr and Mo are also elements that, during an alloying treatment, exert an action that suppresses decomposition of austenite. Therefore, these elements may be contained according to need. However, if any of these elements is contained in an amount that is more than 1.50%, the progress of bainite transformation will be slow, and C will not concentrate in the austenite. As a result the austenite will not be stabilized, and ultimately the volume ratio of fresh martensite will be excessive. Therefore, the content of each of Cr and Mo is made 1.50% or less. The content of each of these elements is preferably 1.30% or less. The Cr content is more preferably 1.20% or less, and the Mo content is more preferably 1.00% or less.

To obtain the aforementioned effects, it is preferable to contain one or more elements selected from Cr and Mo in an amount of 0.01©% or more. More preferably, the amount of Cr that is contained is 0.10% or more, and more preferably the amount of Mo that is contained is 0.05% or more.

Cu: 0 to 5.00%
Ni: 0 to 5.00%

Cu and Ni are elements that have an action that suppresses corrosion. Further, Cu and Ni are elements that concentrate at the surface of the steel sheet and have an action that suppresses penetration of hydrogen into the steel sheet and that suppresses delayed fracture, and are also elements that contribute to stabilization of austenite. Therefore, these elements may be contained according to need. However, if any of these elements is contained in an amount of more than 5.00%, the aforementioned effects are saturated and the production cost increases. Consequently, the content of each of Cu and Ni is made 5.00% or less. The content of each of these elements is preferably 4.00% or less.

To obtain the aforementioned effects, one or more elements selected from Cu and Ni is preferably contained in an amount of 0.01% or more, and preferably is contained in an amount of 0.02% or more.

B: 0 to 0.003%

B is an element that contributes to enhancing the strength of the steel sheet by suppressing nucleation that starts from the grain boundary and increasing hardenability, and hence may be contained according to need. However, if the B content is more than 0.003%, the aforementioned effects are saturated and the production cost increases. Therefore, the B content is made 0.003% or less. Preferably, the B content is 0.002% or less. To obtain the aforementioned effects, the B content is preferably 0.0001% or more, and more preferably is 0.0002% or more.

Ca: 0 to 0.05%
REM: 0 to 0.05%
Mg: 0 to 0.05%

Ca, REM and Mg are elements that cause spheroidization of sulfides and contribute to local elongation of the steel sheet, and thus may be contained according to need. However, if any of these elements is contained in an amount of more than 0.05%, the aforementioned effect is saturated and the production cost rises. Therefore, the content of each of Ca, REM and Mg is made 0.05% or less. The content of each of these elements is preferably 0.04% or less.

To obtain the aforementioned effects, preferably one or more elements selected from Ca, REM and Mg is contained in an amount of 0.0001% or more with respect to Ca and Mg and in an amount of 0.0005% or more with respect to REM.

In the present invention, the term "REM" refers to a total of 16 elements that are Sc and the lanthanoids, and the aforementioned content of REM means the total content of these elements. Note that, in industrial use the lanthanoids are added in the form of misch metal.

W: 0 to 0.50%

W is an element that contributes to enhancing the steel sheet strength by increasing the hardenability, and hence may be contained according to need. However, if the W content is more than 0.50%, the aforementioned effect is saturated and the production cost rises. Therefore the W content is made 0.50% or less. The W content is preferably 0.35% or less. To obtain the aforementioned effect, the W content is preferably 0.005% or more, and more preferably is 0.010% or more.

Zr: 0 to 0.05%

Zr is an element that contributes to enhancing the steel sheet strength by increasing the hardenability, and hence may be contained according to need. However, if the Zr content is more than 0.05%, the aforementioned effect is saturated and the production cost rises. Therefore, the Zr content is made 0.05% or less. The Zr content is preferably 0.03% or less. To obtain the aforementioned effect, the Zr content is preferably 0.005% or more, and more preferably is 0.07% or more.

Sb: 0 to 0.50%
Sn: 0 to 0.50%

Sb and Sn are elements that contribute to wettability of plating and adhesion of a plated layer, and also exert an action that prevents decarburization of steel, and therefore may be contained according to need. However, if any of these elements is contained in an amount that is more than 0.50%, there is a concern that heat embrittlement will occur in the steel sheet and cracks will arise during hot working, and surface defects will arise in the steel sheet. There is also a concern that cracks will also arise during cold working such as shear cutting. Therefore, the content of each of Sb and Sn is made 0.50% or less. The content of each of these elements is preferably 0.35% or less.

To obtain the aforementioned effects, preferably one or more elements selected from Sb and Sn is contained in an amount of 0.005% or more, and containing an amount of 0.010% or more is preferable.

As: 0 to 0.05%
Te: 0 to 0.05%

As and Te are elements that contribute to enhancing the mechanical strength of the steel sheet, and hence may be contained according to need. However, if any of these elements is contained in an amount that is more than 0.05%, there is a concern that the local deformability will decrease. Consequently, the content of each of As and Te is made 0.05% or less. The content of each of these elements is preferably 0.03% or less.

To obtain the aforementioned effects, one or more elements selected from As and Te is preferably contained in an amount of 0.005% or more with respect to As and an amount of 0.001% or more with respect to Te, and more preferably in an amount of 0.010% or more with respect to As and an amount of 0.007% or more with respect to Te.

Y: 0 to 0.20%

Hf: 0 to 0.20%

Y and Hf are effective elements for enhancing the corrosion resistance of the steel sheet, and hence may be contained according to need. However, if any of these elements is contained in an amount that is more than 0.20%, there is a concern that local elongation of the steel sheet will significantly deteriorate. Therefore, the content of each of Y and Hf is made 0.20% or less. The content of each of these elements is preferably 0.15% or less.

To obtain the aforementioned effects one or more elements selected from Y and Hf is preferably contained in an amount of 0.001% or more, and containing an amount of 0.005% or more is preferable.

Co: 0 to 1.00%

Co is an element that has an action that promotes bainite transformation. In order to promote the TRIP effect, it is necessary to cause bainite transformation and to cause C to concentrate in austenite. Hence, Co is a useful element for promoting the TRIP effect. Therefore, Co may be contained according to need. However, if the Co content is more than 1.00%, there is a concern that the weldability and local elongation of the steel sheet will significantly deteriorate. Consequently, the Co content is made 1.00% or less. The Co content is preferably 0.80% or less. To obtain the aforementioned effects, preferably the Co content is 0.001% or more, and more preferably is 0.008% or more.

In the chemical composition of the steel sheet of the present invention, the balance is Fe and impurities.

In this case, the term "impurities" refers to components which, during industrial production of the steel sheet, are mixed in from raw material such as ore or scrap or due to various factors in the production step, and which are allowed within a range that does not adversely affect the present invention.

(B) Steel Micro-Structure of Steel Sheet

The steel micro-structure at a position of ¼ thickness of the sheet thickness of the steel sheet of the present invention will now be described. Note that, in the following description the symbol "%" means "vol. %".

Retained austenite: 10.0 to 60.0%

A steel sheet containing retained austenite is excellent in elongation, specifically, excellent in uniform elongation, because of transformation induced plasticity (TRIP) that occurs when austenite transforms into martensite during working.

If the volume ratio of retained austenite is less than 10.0%, the uniform elongation of the steel sheet will be insufficient. On the other hand, if the volume ratio of retained austenite is more than 60.0%, there is a concern that local elongation of the steel sheet will decrease. Consequently, the volume ratio of retained austenite is made from 10.0 to 60.0%. If the ductility is high, the collision safety of an automobile body will be further enhanced, and therefore when it is desired to secure higher ductility, preferably the volume ratio of retained austenite is made 13.0% or more. The volume ratio of retained austenite is preferably 50.0% or less, more preferably is 40.0% or less, and further preferably is 30.0% or less.

C Amount Contained in Retained Austenite (Cγ): 0.85% by Mass or More

To cause retained austenite to stably exist, it is preferable that C is concentrated in the retained austenite. If Cγ is less than 0.85% by mass, the retained austenite becomes unstable and is liable to disappear. Consequently it will be difficult to secure retained austenite in an amount of 10.0% or more, and in some cases the required uniform elongation or local elongation cannot be secured. Therefore, Cγ is preferably 0.85% by mass or more, more preferably is 0.90% by mass or more, and further preferably is 0.95% by mass or more.

Although an upper limit of Cγ is not particularly defined, if Cγ is more than 1.50% by mass, there is a concern that austenite will stop transforming into martensite during deformation and it will not be possible to obtain a TRIP effect, and the ductility will deteriorate. Therefore, Cγ is preferably 1.50% by mass or less.

High-Temperature Tempered Martensite: 5.0% or More

High-temperature tempered martensite is martensite that was tempered at a temperature of 480 to 600° C. High-temperature tempered martensite is hard in comparison to ferrite and is soft in comparison to low-temperature tempered martensite that is described later, and is estimated to be effective in improving ductility. To obtain the aforementioned effects, it is necessary for the volume ratio of high-temperature tempered martensite to be made 5.0% or more. The volume ratio of high-temperature tempered martensite is preferably 10.0% or more. However, since it will not be possible to secure the volume ratios of low-temperature tempered martensite, retained austenite and bainite if the volume ratio of the high-temperature tempered martensite is excessive, the volume ratio of the high-temperature tempered martensite is preferably made 70.0% or less.

Low-Temperature Tempered Martensite: 5.0% or More

Low-temperature tempered martensite is martensite that was tempered at a temperature of 100 to 450° C. Since low-temperature tempered martensite is hard in comparison to the aforementioned high-temperature tempered martensite, it is a necessary micro-structure for securing a tensile strength of 1470 MPa or more. Therefore, it is necessary to make the volume ratio of the low-temperature tempered martensite 5.0% or more. The volume ratio of the low-temperature tempered martensite is preferably 10.0% or more, and more preferably is 15.0% or more. However, since it will not be possible to secure the volume ratios of high-temperature tempered martensite, retained austenite and bainite if the volume ratio of the low-temperature tempered martensite is excessive, the volume ratio of the low-temperature tempered martensite is preferably made 70.0% or less.

Fresh Martensite: 10.0% or Less

In the case of producing a high-strength steel sheet, although it is usual to make the amount of fresh martensite (untempered martensite) large, in the case of the plated steel sheet of the present invention, if the volume ratio of fresh martensite is more than 10.0%, the local ductility and yield ratio of the steel sheet will decrease, and hence it is not preferable for the volume ratio to be more than 10.0%. Therefore, the volume ratio of fresh martensite is made 10.0% or less. Preferably the volume ratio of fresh martensite is 7.0% or less.

Ferrite: 0 to 15.0%

Because ferrite is a soft micro-structure, a tensile strength of 1470 MPa or more cannot be obtained if the volume ratio of ferrite is more than 15.0%. Therefore, the volume ratio of ferrite is made 15.0% or less.

Pearlite: 0 to 10.0%

If pearlite is formed during the alloying treatment, there is a concern that the pearlite will reduce the volume ratio of retained austenite. Further, because pearlite is a softer micro-structure than tempered martensite, the strength will decrease. Therefore, the volume ratio of pearlite is made 10.0% or less. The volume ratio of pearlite is preferably made as low as possible, and a volume ratio of 5.0% or less is preferable, and a volume ratio of 0% is more preferable.

In the steel micro-structure at the position of ¼ thickness of the sheet thickness of the steel sheet of the present invention, the balance is bainite.

Total Volume Ratio of High-Temperature Tempered Martensite, Low-Temperature Tempered Martensite, and Bainite: 30.0% or More In a case where the total volume ratio of tempered martensite (in the following description "high-temperature tempered martensite" and "low-temperature tempered martensite" are also referred to collectively as "tempered martensite") and bainite is less than 30.0%, when attempting to secure a tensile strength of 1470 MPa it is necessary to increase the volume ratio of fresh martensite. However, if the volume ratio of fresh martensite is increased, the local ductility will decrease. Therefore, from the viewpoint of securing the required local ductility while maintaining a tensile strength of 1470 MPa or more, the aforementioned total volume ratio is made 30.0% or more.

Further, in order to make the volume ratio of retained austenite 10.0% or more, it is necessary to cause C to concentrate in retained austenite during bainite transformation or when tempering martensite. In order to obtain this effect also, the total volume ratio of tempered martensite and bainite is made 30.0% or more. From the viewpoint of improving local deformability and strength, the total volume ratio of tempered martensite and bainite is preferably made 40.0% or more.

Note that, since tempered martensite and bainite not only improve the tensile strength but also contribute to improving the yield strength, it is possible to make the yield ratio 0.58 or more by making the aforementioned total volume ratio a predetermined value or more. Therefore, the plated steel sheet of the present invention is favorable as a member for an automobile.

In the present invention, a method for determining the volume ratio of the respective micro-structures described above is as described hereunder.

The volume ratio (Vγ) of retained austenite can be calculated by the following formula based on data obtained using Mo-Kα rays.

$$V\gamma=(2/3)\{100/(0.7\times\alpha(111)/\gamma(200)+1)\}+(1/3)\{100/(0.78\times\alpha(211)/\gamma(311)+1)\}$$

Where, α(211), γ(200), α(211) and γ(311) represent plane intensity.

Further, the C amount of retained austenite (Cγ) can be calculated according to the following formula by determining a lattice constant (unit: angstroms) from the angles of reflection of the (200) plane, the (220) plane, and the (311) plane of austenite through X-ray analysis using Cu—Kα rays.

$$C\gamma=(\text{lattice constant}-3.572)/0.033$$

Next, by the method described by F. S. Lepera: Journal of Metals 32, No. 3, (1980) 38-39, a cross section in the rolling direction is etched to reveal fresh martensite and retained austenite. Thereafter, at a position of ¼ thickness of the steel sheet, observation is performed at a magnification of 1000 times using an optical microscope, an obtained micro-structure photograph is subjected to image processing to measure the total area fraction (%) of fresh martensite and retained austenite, and the measured value is taken as the total volume ratio.

Subsequently, the volume ratio of fresh martensite is determined by deducting the volume ratio of retained austenite that was measured by the aforementioned method from the value for the total volume ratio of fresh martensite and retained austenite.

In addition, a cross-section perpendicular to the rolling direction is cut out and mirror polished, and thereafter an electrolytically polished sample is measured by SEM-EBSD at step intervals of 0.1 with respect to a region of 100 μm×100 μm or more. Thereafter, using analysis software produced by TSL solutions Ltd., an average value of the transgranular image quality (Grain Average Image Quality: GAIQ value) for each grain is calculated.

Further, the fraction of grains whose GAIQ value is 5000 or less is taken as the total volume ratio of low-temperature tempered martensite and fresh martensite. The volume ratio of low-temperature tempered martensite is then determined by deducting the volume ratio of fresh martensite from the value for the total volume ratio.

Furthermore, after cutting out a cross-section perpendicular to the rolling direction and mirror polishing the cross-section, etching with nital is performed. SEM observation is then performed with respect to the relevant sample, a fraction of micro-structure that is a lath-type structure and that contains cementite is determined as the total area fraction of high-temperature tempered martensite and low-temperature tempered martensite, and that value is taken as the total volume ratio. SEM observation is performed at a magnification of 5000 times, in which the measurement region is four or more visual fields of an area of 25 μm×20 μm. The volume ratio of high-temperature tempered martensite is determined by deducting the volume ratio of low-temperature tempered martensite from the aforementioned value.

The total of bainite and tempered martensite is also determined by SEM observation. A region in which a block of bainite or martensite is observed is taken as being bainite or tempered martensite. The total area fraction of bainite and tempered martensite is then measured, and the resulting value is taken as the total volume ratio.

With respect to ferrite and pearlite also, in a similar manner, after performing nital etching, observation using an SEM is performed and a hollowed-out region in which there is no lower micro-structure is taken as ferrite, and a region in which a lamellar micro-structure can be seen is taken as pearlite. The respective area fractions for ferrite and pearlite are determined, and the resulting values are taken as the volume ratios.

(C) Alloyed Hot-Dip Galvanized Layer

Fe Amount Contained in Alloyed Hot-Dip Galvanized Layer: 3.0 to 20.0% by Mass

The alloyed hot-dip galvanized layer may be a conventional alloyed hot-dip galvanized layer. However, if the Fe amount contained in the plated layer is less than 3.0% by mass, in some cases the weldability and sliding property of the galvannealed steel sheet may be insufficient. Therefore, the Fe amount of the plated layer is preferably 3.0% by mass or more. On the other hand, from the viewpoint of securing powdering resistance, the Fe amount of the plated layer is preferably 20.0% by mass or less.

The Fe amount of the plated layer is more preferably 5.0% by mass or more, and further preferably is 7.0% by mass or more. Further, the Fe amount of the plated layer is more preferably 15.0% by mass or less. Note that, the Fe amount of the plated layer can be adjusted by means of the conditions of a heat treatment (alloying treatment) after hot-dip galvanizing.

(D) Mechanical Properties

From the viewpoint of securing an adequate impact absorption property, the galvannealed steel sheet according to the present invention is made a steel sheet that has a tensile strength of 1470 MPa or more. The upper limit of the tensile strength is not particularly limited. The tensile strength may be appropriately selected within the range of 1470 to 2200 MPa in accordance with the use.

Further, in consideration of application to an automobile component for which formability is required, the product of the tensile strength and uniform elongation is made 13000 MPa·% or more, and the product of the tensile strength and local elongation is made 5000 MPa·% or more. Because uniform deformation characteristics and local deformation characteristics are necessary for an automobile component, it is necessary to satisfy the foregoing two conditions.

The yield ratio affects the strength of a machine component that is obtained by carrying out forming of the steel sheet. For example, a high yield ratio is required in order to increase the collision safety properties (raise the collision energy) of the automobile component. Therefore, the yield ratio of the plated steel sheet according to the present invention is preferably 0.58 or more, more preferably is 0.70 or more, and further preferably is 0.80 or more. Further, from a similar viewpoint, the plated steel sheet according to the present invention preferably has a yield strength of 850 MPa or more.

Note that, in the present invention, values obtained in a tension test in a direction perpendicular to the rolling direction are adopted as the tensile strength and the yield strength. The term "direction perpendicular to the rolling direction" refers to a direction that is perpendicular to the rolling direction and thickness direction of the steel sheet, that is, the width direction.

In addition, in a case of using the galvannealed steel sheet according to the present invention as a blank steel sheet for an automobile component that receives a repetitive load, in addition to excellent uniform deformation characteristics and local deformation characteristics, excellent fatigue characteristics are also required. When it is desired to secure predetermined fatigue characteristics, a ratio of the fatigue limit to the tensile strength is preferably made 0.30 or more, and more preferably is made 0.35 or more. Note that, the fatigue limit of a steel sheet is measured by making the stress ratio −1, making the repetition frequency 25 Hz, and making the maximum number of repetitions $2 \times 10^6$ times.

(E) Outer-Layer Micro-Structure of Steel Sheet

The galvannealed steel sheet according to the present invention includes a surface soft layer. The term "surface soft layer" refers to a layer that is present in the outer layer of the steel sheet and that has a hardness that is not more than 0.9 times the average hardness in a region from a position of ¼ thickness of the sheet thickness to a position of ½ thickness of the sheet thickness.

In the present invention, since high strength and excellent formability can be obtained by controlling the chemical composition and the steel micro-structure at a position of ¼ thickness of the sheet thickness, the thickness of the surface soft layer is not particularly limited. However, additional characteristics can be obtained by appropriately adjusting the thickness of the surface soft layer according to the use.

For example, when welding a steel sheet for an automobile that has been subjected to galvanization, liquid metal embrittlement cracking may occur in a weld zone. The higher the strength of the steel sheet, the more likely it is that liquid metal embrittlement cracking will occur. However, in addition to the foregoing conditions regarding the chemical composition and steel micro-structure, by making the thickness of the surface soft layer more than 10 μm it is possible to secure excellent liquid metal embrittlement cracking resistance.

On the other hand, as described above, excellent fatigue characteristics are required in the case of using the plated steel sheet as a blank steel sheet for an automobile component that receives a cyclic load. In addition to the foregoing conditions regarding the chemical composition and steel micro-structure, by making the thickness of the surface soft layer 10 μm or less it is possible to improve the fatigue characteristics and make the ratio of the fatigue limit to the tensile strength 0.30 or more.

Note that, the thickness of the surface soft layer is determined by the following procedure. First, a cross-section perpendicular to the rolling direction is cut out and mirror polished. Next, the micro-Vickers hardness is sequentially measured at a pitch of 10 μm from a position that is 10 μm from the interface between the plated layer and the steel sheet to the center of the sheet thickness (position of ½ thickness of the sheet thickness) in the relevant sample. The test force may be suitably selected in accordance with the hardness of the micro-structure, and, for example, can be made 2 to 25 gf. Further, in a case where indentations overlap, the measurement position may be shifted in a direction perpendicular to the sheet thickness.

Based on the results of the above measurement, the average hardness in a region from a position of ¼ thickness of the sheet thickness to a position of ½ thickness of the sheet thickness is determined, and a position at which the hardness 0.9 times the average hardness is identified. A distance from the interface between the plated layer and the steel sheet to the aforementioned position at which the hardness is 0.9 times the average hardness is defined as the thickness of the surface soft layer.

However, if the hardness at a position that is 10 μm from the interface between the plated layer and the steel sheet is more than 0.9 times the average hardness in a region from a position of ¼ thickness of the sheet thickness to a position of ½ thickness of the sheet thickness, it is difficult to measure the thickness of the surface soft layer by the aforementioned method. In such case, the thickness of the surface soft layer is determined by examining changes in the micro-structure fraction by SEM observation.

Specifically, the micro-structure of the outer layer is measured at a magnification of 500 to 1000 times, and the steel micro-structure is observed across an area of 100 to 200 µm in a direction perpendicular to the sheet thickness direction. Next, fractions of the hard micro-structure are respectively determined at positions that are 2, 4, 6, 8 and 10 µm from the interface between the plated layer and the steel sheet. Further, the average fraction of the hard microstructure in a region from a position of ¼ thickness of the sheet thickness to a position of ½ thickness of the sheet thickness is determined, a position at which the fraction of the hard micro-structure is 0.9 times the aforementioned average fraction is identified, and a distance from that position to the interface between the plated layer and the steel sheet is defined as the thickness of the surface soft layer. In this case, the term "fraction of the hard microstructure" refers to the total area fraction of the microstructure other than ferrite and pearlite.

(F) Production Method

Although conditions for producing the galvannealed steel sheet according to the present invention are not particularly limited, the galvannealed steel sheet can be produced by using the production method described hereunder. In the production method described hereunder, the steps from the following (a) to (l) are performed in sequence. Each step will now be described in detail.

(a) Melting Step

An ingot or a slab having the chemical composition described above is melted. The conditions for the melting step are not particularly limited, and a conventional method may be used.

(b) Hot-Rolling Step

The ingot or slab is heated and subjected to hot-rolling to be formed into a hot-rolled steel sheet. Although limitations are not particularly set with respect to the conditions in the hot-rolling step, for example, preferably the heating temperature before hot-rolling is made 1000 to 1300° C., and the finishing temperature for hot-rolling is made 800 to 1000° C.

If the heating temperature is less than 1000° C., there is a concern that the temperature will decrease while the ingot or slab is being conveyed to hot-rolling, and it will not be possible to complete the finish rolling at the required temperature. On the other hand, if the heating temperature is more than 1300° C., there is a concern that the fusing point of the steel having the aforementioned chemical composition will be reached and the steel will fuse.

Further, since the steel having the chemical composition defined by the present invention is hard, if the finishing temperature is less than 800° C., there is a concern that a large load will be placed on the rolling mill and hot-rolling will be difficult. On the other hand, if the finishing temperature is more than 1000° C., there is a concern that crystals of the steel sheet after rolling will be coarse and the various characteristics of the galvannealed steel sheet that is ultimately obtained will deteriorate.

(c) First Cooling Step

After finish rolling ends, the hot-rolled steel sheet is cooled. Although cooling conditions are not particularly set with respect to the first cooling step, preferably the hot-rolled steel sheet is cooled at an average cooling rate of 10° C./s or more, and cooling is stopped in the temperature range of 300 to 700° C.

Although it is easy to obtain an Mn concentration effect if the micro-structure of the hot-rolled steel sheet is fine, if the average cooling rate is less than 10° C./s, there is a concern that phase transformation will occur at a high temperature and the micro-structure will coarsen. Although the upper limit of the average cooling rate is not particularly limited, industrially, if the average cooling rate is more than 200° C./s, it becomes difficult to control the cooling stopping temperature, and variations arise in the material quality. Therefore, the average cooling rate is preferably 200° C./s or less, more preferably is 100° C./s or less, and further preferably is 60° C./s or less.

Further, if the cooling stopping temperature is less than 300° C., there is a concern that the micro-structure of the steel sheet will be mainly composed of martensite and coiling will be difficult. On the other hand, if the cooling stopping temperature is more than 700° C., there is a concern that scale generated on the surface of the steel sheet will reach as far as the interior of the steel sheet, and hence pickling will be difficult. Note that, since the matters that present a problem with respect to production are the strength of the hot-rolled steel sheet and the ease of pickling, the cooling stopping temperature can be appropriately set in consideration of these matters.

(d) Coiling Step

The hot-rolled steel sheet is coiled after cooling stops. Although the coiling temperature is not particularly limited, the temperature is preferably made not more than 700° C. Similarly to the cooling stopping temperature in the aforementioned first cooling step, with respect to the coiling temperature also, the temperature can be appropriately set in consideration of the strength of the hot-rolled steel sheet and the ease of pickling.

(e) Cold-Rolling Step

The hot-rolled steel sheet that was coiled is unwound again and pickled, and thereafter subjected to cold rolling to be formed into a cold-rolled steel sheet. No particular limitations are set with respect to the cold-rolling step. However, since the steel having the chemical composition defined by the present invention is hard, if the rolling reduction is more than 90%, it will be difficult to end the cold rolling in a short time. Therefore, the rolling reduction in the cold-rolling step is preferably 90% or less. It is good to appropriately set the rolling reduction in range up to not more than 90% by taking into consideration the desired sheet thickness and the capacity of the rolling mill.

(f) Annealing Step

After cold rolling, the cold-rolled steel sheet is subjected to annealing that maintains the cold-rolled steel sheet in a temperature range from the $Ac_1$ point to 920° C. for 5 s or more. If the annealing temperature is less than the $Ac_1$ point, cementite will not transform to austenite and it will not be possible to obtain bainite, retained austenite and tempered martensite as the final micro-structure, and hence it is necessary for the annealing temperature to be not less than the $Ac_1$ point. On the other hand, the higher that the annealing temperature is, the thicker that scale which is generated on the steel sheet becomes, and wettability at the time of plating deteriorates by a corresponding amount. Further, from the viewpoint of suppressing coarsening of the grain size and securing favorable toughness and also from the viewpoint of decreasing the energy cost, the annealing temperature is made 920° C. or less. The annealing temperature is preferably made 900° C. or less.

Further, if the holding time period for which the cold-rolled steel sheet is maintained at the aforementioned annealing temperature is less than 5 s, temperature inconsistencies arise depending on the location in the steel sheet, and the micro-structure cannot be adequately uniformized and it is difficult to obtain sufficient local elongation. Therefore, the holding time is made 5 s or more. Preferably the holding time is made 10 s or more.

No particular limitations are set with respect to the annealing atmosphere. However, in order to adjust the thickness of the surface soft layer of the steel sheet, it is desirable to subject the annealing atmosphere to dew point control in an appropriate manner in accordance with the annealing temperature. As described above, in a case where the thickness of the surface soft layer is 10 µm or less, the ratio of the fatigue limit with respect to the tensile strength of the steel sheet increases, and the fatigue characteristics improve. When the thickness of the surface soft layer is more than 10 µm, the liquid metal embrittlement cracking resistance of the steel sheet improves.

Specifically, to make the thickness of the surface soft layer more than 10 µm, preferably the dew point of the annealing atmosphere is made −25° C. or higher, more preferably is made higher than −15° C., and further preferably is made higher than −10° C. On the other hand, to make the thickness of the surface soft layer 10 µm or less, preferably the dew point of the annealing atmosphere is made −15° C. or less, more preferably is made −20° C. or less, and further preferably is made −25° C. or less.

(g) Second Cooling Step

After annealing, the cold-rolled steel sheet is cooled to a temperature range of 100 to 350° C. at an average cooling rate of 1° C./s or more. If the average cooling rate in the second cooling step is less than 1° C./s, the risk of cementite in the steel sheet precipitating arises. The average cooling rate is preferably 5° C./s or more, and more preferably is 8° C./s or more.

However, if the average cooling rate is more than 100° C./s, because the cooling rate is too fast, it is difficult to cause the steel sheet to enter a temperature range (100 to 350° C.) in which retained austenite occurs. Therefore, the average cooling rate is preferably made a rate that facilitates control to the target cooling stopping temperature, and preferably is made 100° C./s or less, and more preferably is made 50° C./s or less.

Further, if the cooling stopping temperature is less than 100° C., there is a concern that most of the austenite will transform into martensite, and it will not be possible to secure retained austenite in an amount of 10 vol. % or more in the final micro-structure. On the other hand, if the cooling stopping temperature is more than 350° C., there is a concern that the amount of martensite transformation will be small and that it will not be possible to secure an amount of 5 vol. % or more of the high-temperature tempered martensite that is to be obtained thereafter. Therefore, the cooling stopping temperature is made 100 to 350° C.

The lower limit of the cooling stopping temperature may be appropriately set in accordance with the steel grade or the heat treatment conditions, and the lower limit is preferably made 130° C. or more, more preferably 150° C. or more, further preferably 175° C. or more, and particularly preferably is made 200° C. or more. Further, the cooling stopping temperature is preferably made 300° C. or less.

(h) Pre-Treatment Step

Prior to conducting hot-dip galvanizing on the cold-rolled steel sheet, a pre-treatment is performed to cool or heat the cold-rolled steel sheet to a hot-dip galvanizing bath temperature. If the steel sheet is immersed in a plating bath while the temperature of the steel sheet deviates significantly from the plating temperature, there is a possibility this may lead to poor appearance of the steel sheet. Note that, it is not necessary to make the temperature of the cold-rolled steel sheet and the plating bath temperature strictly match, and a difference up to around 50° C. is acceptable.

(i) Plating Step

After the pre-treatment is completed, the cold-rolled steel sheet is immersed in a hot-dip galvanizing bath to subject the steel sheet to hot-dip galvanizing and make the steel sheet into a hot-dip galvanized steel sheet. The bath composition and bath temperature of the hot-dip galvanizing bath as well as the plating adhesion amount are not particularly limited, and can be appropriately set in accordance with the desired composition and thickness of the hot-dip galvanized layer. With respect to the plating adhesion amount, for example, the plating adhesion amount per side can be set within a range of 20 to 80 $g/m^2$.

(j) Alloying Step

The hot-dip galvanized steel sheet is heated to 480 to 600° C. such that the hot-dip galvanized steel sheet is alloyed to make a galvannealed steel sheet. The conditions for the alloying treatment can be appropriately set so as to enable a predetermined amount or more of Fe to be secured in the alloyed hot-dip galvanized layer. For example, in a case where the plating adhesion amount per side is within a range of 20 to 80 $g/m^2$, preferably the hot-dip galvanized steel sheet is heated to 490 to 560° C. and held at that temperature for 5 to 60 s.

(k) Third Cooling Step

After the alloying treatment, the galvannealed steel sheet is cooled to a temperature range of 80 to 300° C. at an average cooling rate of 1° C./s or more. The cooling starting temperature in the third cooling step is the steel sheet temperature at the time that the alloying step ends.

By the cooling of the third cooling step, partial formation of martensite is promoted, and distribution of C to austenite from martensite and bainite transformation is promoted to thereby stabilize the retained austenite. In order to secure retained austenite in an amount of 10 vol. % or more in a tempering step after the third cooling step, it is necessary that an amount of 10 vol. % or more of austenite is present in the steel sheet at the time point at which the third cooling step ends.

If the average cooling rate is less than 1° C./s, there is a concern that the aforementioned effects will not be obtained. Preferably the average cooling rate is made 5° C./s or more. Although the upper limit of the average cooling rate is not particularly limited, from the viewpoint of economic efficiency, preferably the average cooling rate is made 500° C./s or less.

Further, if the cooling stopping temperature is less than 80° C. or is more than 300° C., likewise there is a concern that the aforementioned effects will not be obtained. Preferably the cooling stopping temperature is 110° C. or more. Since the strength increases if the cooling stopping temperature is low, the temperature at the end of cooling is preferably 250° C. or less.

(l) Tempering Step

After cooling stops, the galvannealed steel sheet is subjected to tempering in which the galvannealed steel sheet is held in a temperature range of 100 to 450° C. for a time period from 1 s to 48 h. Tempering is performed to obtain an effect of tempering the martensite, an effect of promoting bainite transformation, and an effect of causing C to concentrate into retained austenite from martensite and bainite.

If the tempering temperature is less than 100° C., there is a concern that the aforementioned effects will not be obtained. On the other hand, if the tempering temperature is more than 450° C., high-temperature tempered martensite will be formed and the strength will significantly deteriorate. Further, austenite in which C is concentrated will decompose into pearlite. Therefore, the tempering temperature is made 100 to 450° C. The tempering temperature is preferably made 120° C. or more, and more preferably 140° C. or more. Further, the tempering temperature is preferably made 430° C. or less.

Further, if the tempering time (holding time) is less than 1 s, a tempering effect will not be obtained. On the other hand, if the tempering time is more than 48 h, there is a concern that even if the tempering temperature is made 100 to 450° C., carbides will precipitate and retained austenite will decrease significantly. Therefore, the tempering time is made a time period between 1 s and 48 h. Preferably the tempering time is made 10 s or more, and more preferably is made 30 s or more. Further, the tempering time is preferably made 45 h or less, and more preferably is made 40 h or less.

(m) Other

After the tempering step, to improve the evenness of the galvannealed steel sheet, the steel sheet may be subjected to skin pass rolling or a leveler step. In addition, a coating film having an oiling or lubricating action may be formed on the galvannealed steel sheet.

As described above, by using the aforementioned production method, even when a steel sheet contains 0.25% by mass or more of C, a galvannealed steel sheet of 1470 MPa grade or more that also has high ductility can be produced.

Hereunder, the present invention is described specifically by way of an example, although the present invention is not limited to the following example.

Example 1

The respective steels having the chemical compositions shown in Table 1 were melted and slabs having a thickness of 40 mm were prepared. The slabs were hot-rolled under the conditions shown in Tables 2 to 4 to produce hot-rolled steel sheets.

Next, the aforementioned hot-rolled steel sheets were respectively cooled by water spraying until reaching the coiling temperature at the rates (first cooling rates) shown in Tables 2 to 4. Thereafter, the hot-rolled steel sheets were fed into a furnace, held for 60 min at the coiling temperature, and subjected to furnace cooling to a temperature of 100° C. or less at an average cooling rate of 20° C./h, thereby simulating coiling. After pickling the obtained hot-rolled steel sheets to remove scale, the respective steel sheets were subjected to cold rolling under the conditions shown in Table 2 to 4.

TABLE 1

| Steel | Chemical composition (by mass %, balance: Fe and impurities) | | | | | | | | | | | | Transformation point (° C.) | | |
|---|---|---|---|---|---|---|---|---|---|---|---|---|---|---|---|
| | C | Si | Mn | Al | P | S | N | O | Cr | Mo | Ti | Others | Si + Al | $Ac_1$ | $Ac_3$ |
| A | 0.38 | 1.86 | 2.90 | 0.046 | 0.009 | 0.0011 | 0.0028 | <0.0010 | — | — | — | — | 1.91 | 746 | 806 |
| B | 0.38 | 1.64 | 2.11 | 0.041 | 0.011 | 0.0006 | 0.0027 | <0.0010 | 0.40 | — | — | — | 1.68 | 755 | 815 |
| C | 0.38 | 1.66 | 2.50 | 0.025 | 0.012 | 0.0013 | 0.0028 | <0.0010 | 0.20 | 0.1 | — | — | 1.69 | 748 | 800 |
| D | 0.38 | 1.93 | 1.99 | 0.030 | 0.011 | 0.0007 | 0.0021 | <0.0010 | 0.30 | 0.1 | — | — | 1.96 | 763 | 828 |
| E | 0.32 | 1.86 | 2.87 | 0.044 | 0.010 | 0.0009 | 0.0031 | <0.0010 | — | — | — | — | 1.90 | 746 | 817 |
| F | 0.43 | 1.70 | 2.87 | 0.022 | 0.010 | 0.0009 | 0.0029 | <0.0010 | — | — | — | — | 1.72 | 742 | 783 |
| G | 0.38 | 1.20 | 2.22 | 0.025 | 0.012 | 0.0012 | 0.0021 | <0.0010 | 0.31 | — | — | — | 1.23 | 739 | 788 |
| H | 0.38 | 2.10 | 2.22 | 0.049 | 0.009 | 0.0013 | 0.0032 | <0.0010 | 0.31 | — | — | — | 2.15 | 766 | 835 |
| I | 0.38 | 1.89 | 1.90 | 0.038 | 0.009 | 0.0009 | 0.0024 | <0.0010 | — | — | — | — | 1.93 | 758 | 835 |
| J | 0.38 | 1.89 | 3.80 | 0.040 | 0.009 | 0.0013 | 0.0033 | <0.0010 | — | — | — | — | 1.93 | 737 | 777 |
| K | 0.38 | 1.89 | 1.70 | 0.038 | 0.010 | 0.0011 | 0.0021 | <0.0010 | 1.40 | — | — | — | 1.93 | 123 | 825 |
| L | 0.38 | 1.89 | 1.68 | 0.043 | 0.010 | 0.0011 | 0.0032 | <0.0010 | — | 0.4 | — | — | 1.93 | 760 | 843 |
| M | 0.38 | 1.86 | 2.90 | 0.026 | 0.008 | 0.0006 | 0.0034 | <0.0010 | — | — | 0.007 | — | 1.89 | 746 | 800 |
| N | 0.38 | 1.64 | 2.11 | 0.047 | 0.012 | 0.0009 | 0.0035 | <0.0010 | 0.40 | — | 0.007 | — | 1.69 | 755 | 821 |
| O | 0.38 | 1.66 | 2.50 | 0.041 | 0.009 | 0.0011 | 0.0020 | <0.0010 | 0.20 | 0.1 | 0.007 | — | 1.70 | 748 | 808 |
| P | 0.38 | 1.93 | 1.99 | 0.041 | 0.012 | 0.0012 | 0.0023 | <0.0010 | 0.30 | 0.1 | 0.007 | — | 1.97 | 763 | 837 |
| Q | 0.38 | 1.85 | 2.19 | 0.027 | 0.010 | 0.0006 | 0.0028 | <0.0010 | — | — | — | Ni: 0.3 | 1.88 | 753 | 819 |
| R | 0.38 | 1.89 | 2.15 | 0.026 | 0.011 | 0.0011 | 0.0033 | <0.0010 | 0.40 | — | — | Ni: 0.1, Cu: 0.1 | 1.92 | 762 | 819 |
| S | 0.38 | 1.87 | 2.14 | 0.037 | 0.009 | 0.0011 | 0.0032 | <0.0010 | 0.40 | — | 0.050 | — | 1.91 | 761 | 843 |
| T | 0.38 | 1.89 | 2.13 | 0.047 | 0.010 | 0.0011 | 0.0023 | <0.0010 | 0.40 | — | — | Nb: 0.05 | 1.94 | 762 | 826 |
| U | 0.38 | 1.85 | 2.20 | 0.022 | 0.008 | 0.0008 | 0.0033 | <0.0010 | 0.40 | — | — | V: 0.05 | 1.87 | 760 | 817 |
| V | 0.38 | 1.88 | 2.10 | 0.028 | 0.012 | 0.0013 | 0.0027 | <0.0010 | 0.40 | — | — | Ca: 0.0010 | 1.91 | 762 | 821 |
| W | 0.38 | 1.88 | 2.20 | 0.031 | 0.008 | 0.0009 | 0.0026 | <0.0010 | 0.40 | — | — | REM: 0.009 | 1.91 | 761 | 817 |
| X | 0.38 | 1.88 | 2.18 | 0.050 | 0.008 | 0.0008 | 0.0024 | <0.0010 | 0.40 | — | — | W: 0.1 | 1.93 | 761 | 825 |
| Y | 0.38 | 1.85 | 2.10 | 0.028 | 0.011 | 0.0008 | 0.0034 | <0.0010 | 0.40 | — | — | Mg: 0.001 | 1.88 | 761 | 819 |
| Z | 0.38 | 1.88 | 2.11 | 0.027 | 0.011 | 0.0008 | 0.0031 | <0.0010 | 0.40 | — | — | Zr: 0.1 | 1.91 | 762 | 821 |
| AA | 0.38 | 1.85 | 2.15 | 0.024 | 0.012 | 0.0011 | 0.0024 | <0.0010 | 0.40 | — | — | Sb: 0.02 | 1.87 | 761 | 817 |
| AB | 0.38 | 1.89 | 2.14 | 0.050 | 0.010 | 0.0009 | 0.0026 | <0.0010 | 0.40 | — | — | Sn: 0.02 | 1.94 | 762 | 827 |
| AC | 0.38 | 1.87 | 2.11 | 0.031 | 0.009 | 0.0012 | 0.0021 | <0.0010 | 0.40 | — | — | As: 0.02 | 1.90 | 762 | 819 |
| AD | 0.38 | 1.85 | 2.12 | 0.050 | 0.012 | 0.0010 | 0.0023 | <0.0010 | 0.40 | — | — | Te: 0.009 | 1.90 | 761 | 829 |
| AE | 0.38 | 1.89 | 2.10 | 0.033 | 0.010 | 0.0008 | 0.0025 | <0.0010 | 0.40 | — | — | Y: 0.008 | 1.92 | 762 | 822 |
| AF | 0.38 | 1.88 | 2.20 | 0.036 | 0.012 | 0.0013 | 0.0022 | <0.0010 | 0.40 | — | — | Hf: 0.008 | 1.92 | 761 | 822 |
| AG | 0.38 | 1.89 | 2.20 | 0.049 | 0.008 | 0.0010 | 0.0026 | <0.0010 | 0.40 | — | — | Co: 0.3 | 1.94 | 761 | 824 |
| AH | 0.27 | 1.47 | 2.51 | 0.022 | 0.008 | 0.0009 | 0.0027 | <0.0010 | 0.30 | 0.1 | 0.030 | — | 1.49 | 744 | 819 |
| AI | 0.31 | 1.61 | 2.70 | 0.022 | 0.008 | 0.0009 | 0.0021 | <0.0010 | — | — | 0.030 | Ni: 0.1 | 1.63 | 741 | 815 |
| AJ | 0.35 | 1.52 | 2.30 | 0.021 | 0.009 | 0.0009 | 0.0030 | <0.0010 | 0.25 | 0.2 | — | — | 1.54 | 747 | 801 |
| AK | 0.30 | 1.43 | 2.80 | 0.030 | 0.007 | 0.0010 | 0.0032 | <0.0010 | 0.10 | 0.1 | 0.010 | B: 0.0018 | 1.46 | 736 | 799 |
| AL | 0.38 | 0.32 | 2.80 | 0.500 | 0.070 | 0.0010 | 0.0032 | <0.0010 | — | — | — | — | 0.82 | 702 | 964 |
| AM | 0.38 | 1.67 | 1.25 | 0.032 | 0.070 | 0.0010 | 0.0040 | <0.0010 | 1.00 | 0.5 | 0.012 | B: 0.0015 | 1.70 | 775 | 878 |
| a | 0.22 * | 1.87 | 2.90 | 0.043 | 0.008 | 0.0010 | 0.0028 | <0.0010 | — | — | — | — | 1.91 | 746 | 814 |
| b | 0.75 * | 1.64 | 2.14 | 0.036 | 0.010 | 0.0013 | 0.0027 | <0.0010 | 0.40 | — | — | — | 1.68 | 755 | 734 |

TABLE 1-continued

| Steel | Chemical composition (by mass %, balance: Fe and impurities) | | | | | | | | | | | | Transformation point (° C.) | | |
|---|---|---|---|---|---|---|---|---|---|---|---|---|---|---|---|
| | C | Si | Mn | Al | P | S | N | O | Cr | Mo | Ti | Others | Si + Al | $Ac_1$ | $Ac_3$ |
| c | 0.38 | 0.10 * | 2.15 | 0.050 | 0.012 | 0.0006 | 0.0034 | <0.0010 | 0.40 | — | — | — | 0.15 | 710 | 785 |
| d | 0.38 | 3.00 * | 2.18 | 0.041 | 0.009 | 0.0010 | 0.0035 | <0.0010 | 0.40 | — | — | — | 3.04 | 795 | 786 |
| e | 0.38 | 1.89 | 0.80 * | 0.049 | 0.012 | 0.0008 | 0.0020 | <0.0010 | 0.40 | — | — | — | 1.94 | 777 | 785 |
| f | 0.38 | 1.90 | 6.00 * | 0.041 | 0.009 | 0.0007 | 0.0029 | <0.0010 | 0.40 | — | — | — | 1.94 | 721 | 786 |
| g | 0.38 | 1.85 | 2.17 | 0.031 | 0.012 | 0.0011 | 0.0034 | <0.0010 | 2.00 * | — | — | — | 1.88 | 788 | 785 |
| h | 0.38 | 1.87 | 2.10 | 0.043 | 0.011 | 0.0011 | 0.0033 | <0.0010 | — | 2.0 * | — | — | 1.91 | 756 | 785 |

* indicates that conditions do not satisfy those defined by the present invention.

TABLE 2

| Test No. | Steel | Production conditions | | | | | | | | | | | |
|---|---|---|---|---|---|---|---|---|---|---|---|---|---|
| | | Finishing temperature (° C.) | First cooling rate (° C./s) | Coiling temperature (° C.) | Rolling reduction (%) | Maximum annealing temperature (° C.) | Annealing time (s) | Dew point (° C.) | Second cooling rate (° C./s) | Second cooling stopping temperature (° C.) | GA condition | Third cooling stopping temperature (° C.) | Tempering (temperature × time) |
| 1 | A | 910 | 52 | 600 | 60 | 860 | 100 | 10 | 7 | 200 | 550° C. × 30 s | 115 | 350° C. × 350 s |
| 2 | A | 923 | 54 | 600 | 60 | 860 | 100 | -40 | 7 | 300 | 550° C. × 30 s | 180 | 350° C. × 600 s |
| 3 | A | 923 | 54 | 600 | 60 | 860 | 100 | 10 | 7 | 265 | 550° C. × 30 s | 115 | 400° C. × 34 s |
| 4 | A | 910 | 52 | 600 | 60 | 860 | 100 | 10 | 20 | 200 | 550° C. × 30 s | 118 | 350° C. × 350 s |
| 5 | A | 950 | 80 | 560 | 71 | 860 | 180 | 10 | 7 | 368 | 550° C. × 30 s | 210 | 350° C. × 600 s |
| 6 | A | 897 | 50 | 600 | 60 | 720 | 100 | 10 | 7 | 265 | 550° C. × 30 s | 110 | 350° C. × 600 s |
| 7 | A | 916 | 53 | 600 | 60 | 860 | 100 | 10 | 0.4 | 265 | 550° C. × 30 s | 130 | 350° C. × 350 s |
| 8 | A | 929 | 55 | 600 | 60 | 860 | 100 | 10 | 7 | 265 | 550° C. × 30 s | 115 | 350° C. × 55 h |
| 9 | B | 914 | 52 | 600 | 60 | 860 | 100 | 10 | 7 | 200 | 550° C. × 30 s | 115 | 350° C. × 350 s |
| 10 | B | 884 | 47 | 600 | 60 | 860 | 100 | 10 | 7 | 220 | 550° C. × 30 s | 120 | 350° C. × 350 s |
| 11 | B | 903 | 51 | 600 | 60 | 860 | 100 | 10 | 7 | 252 | 550° C. × 30 s | 140 | 350° C. × 350 s |
| 12 | B | 885 | 48 | 600 | 60 | 860 | 100 | -40 | 7 | 300 | 550° C. × 30 s | 180 | 350° C. × 350 s |
| 13 | B | 916 | 53 | 600 | 60 | 860 | 100 | 10 | 7 | 284 | 550° C. × 30 s | 134 | 300° C. × 350 s |
| 14 | B | 905 | 51 | 600 | 60 | 860 | 100 | 10 | 7 | 284 | 550° C. × 30 s | 134 | 350° C. × 350 s |
| 15 | B | 898 | 50 | 600 | 60 | 860 | 100 | 10 | 7 | 284 | 550° C. × 30 s | 134 | 400° C. × 350 s |
| 16 | B | 884 | 47 | 600 | 60 | 860 | 100 | 10 | 60 | 220 | 550° C. × 30 s | 125 | 350° C. × 350 s |
| 17 | B | 902 | 50 | 600 | 60 | 860 | 100 | 10 | 7 | 70 | 550° C. × 30 s | 180 | 350° C. × 350 s |
| 18 | B | 891 | 49 | 600 | 60 | 860 | 100 | 10 | 7 | 650 | 550° C. × 30 s | 180 | 350° C. × 350 s |
| 19 | B | 950 | 85 | 560 | 71 | 860 | 180 | 10 | 7 | 380 | 560° C. × 30 s | 210 | 350° C. × 350 s |
| 20 | B | 884 | 47 | 600 | 60 | 860 | 100 | 10 | 7 | 284 | 550° C. × 30 s | 134 | 530° C. × 350 s |
| 21 | B | 886 | 48 | 600 | 60 | 860 | 100 | 10 | 7 | 284 | 550° C. × 30 s | 134 | 90° C. × 350 s |
| 22 | B | 886 | 48 | 600 | 60 | 860 | 100 | 10 | 7 | 275 | 550° C. × 30 s | 130 | none |
| 23 | C | 930 | 55 | 600 | 60 | 860 | 100 | 10 | 7 | 200 | 550° C. × 30 s | 115 | 350° C. × 350 s |
| 24 | C | 896 | 49 | 600 | 60 | 860 | 100 | -40 | 7 | 300 | 550° C. × 30 s | 180 | 350° C. × 350 s |
| 25 | C | 950 | 83 | 560 | 71 | 860 | 180 | 10 | 7 | 425 | 550° C. × 30 s | 210 | 350° C. × 350 s |
| 26 | C | 909 | 52 | 600 | 60 | 860 | 100 | 10 | 7 | 273 | 464° C. × 30 s | 175 | 350° C. × 350 s |
| 27 | C | 907 | 51 | 600 | 60 | 860 | 100 | 10 | 7 | 273 | 650° C. × 30 s | 243 | 350° C. × 350 s |
| 28 | D | 905 | 51 | 600 | 60 | 860 | 100 | 10 | 7 | 200 | 550° C. × 30 s | 115 | 350° C. × 350 s |
| 29 | D | 922 | 54 | 600 | 60 | 860 | 100 | -40 | 7 | 300 | 550° C. × 30 s | 180 | 350° C. × 350 s |
| 30 | D | 904 | 51 | 600 | 60 | 860 | 100 | 10 | 7 | 288 | 550° C. × 30 s | 258 | 350° C. × 350 s |
| 31 | D | 884 | 47 | 600 | 60 | 860 | 100 | 10 | 7 | 288 | 550° C. × 30 s | 340 | 350° C. × 350 s |
| 32 | D | 930 | 55 | 600 | 60 | 860 | 100 | 10 | 7 | 288 | 550° C. × 30 s | 30 | 350° C. × 350 s |
| 33 | E | 924 | 54 | 600 | 60 | 860 | 100 | 10 | 7 | 295 | 550° C. × 30 s | 145 | 350° C. × 600 s |
| 34 | F | 918 | 53 | 600 | 60 | 860 | 100 | 10 | 7 | 242 | 550° C. × 30 s | 92 | 350° C. × 600 s |
| 35 | G | 921 | 54 | 600 | 60 | 860 | 100 | 10 | 7 | 285 | 550° C. × 30 s | 135 | 350° C. × 350 s |
| 36 | G | 921 | 54 | 600 | 60 | 860 | 100 | 10 | 80 | 285 | 550° C. × 30 s | 140 | 350° C. × 350 s |

* indicates that conditions do not satisfy those defined by the present invention.

TABLE 3

| Test No. | Steel | Finishing temperature (°C.) | First cooling rate (°C./s) | Coiling temperature (°C.) | Rolling reduction (%) | Maximum annealing temperature (°C.) | Annealing time (s) | Dew point (°C.) | Second cooling rate (°C./s) | Second cooling stopping temperature (°C.) | GA condition | Third cooling stopping temperature (°C.) | Tempering (temperature × time) |
|---|---|---|---|---|---|---|---|---|---|---|---|---|---|
| 37 | H | 890 | 48 | 600 | 60 | 860 | 100 | 10 | 7 | 284 | 550° C. × 30 s | 134 | 350° C. × 350 s |
| 38 | I | 922 | 54 | 600 | 60 | 860 | 100 | 10 | 7 | 301 | 550° C. × 30 s | 131 | 350° C. × 600 s |
| 39 | J | 888 | 48 | 600 | 60 | 860 | 100 | 10 | 7 | 234 | 550° C. × 30 s | 84 | 350° C. × 600 s |
| 40 | K | 884 | 47 | 600 | 60 | 860 | 100 | 10 | 7 | 281 | 550° C. × 30 s | 131 | 350° C. × 350 s |
| 41 | L | 885 | 48 | 600 | 60 | 860 | 100 | 10 | 7 | 298 | 550° C. × 30 s | 148 | 350° C. × 350 s |
| 42 | M | 930 | 55 | 600 | 60 | 860 | 100 | 10 | 7 | 200 | 550° C. × 30 s | 140 | 350° C. × 350 s |
| 43 | N | 882 | 47 | 600 | 60 | 860 | 100 | 10 | 7 | 200 | 550° C. × 30 s | 140 | 350° C. × 350 s |
| 44 | O | 913 | 52 | 600 | 60 | 860 | 100 | 10 | 7 | 200 | 550° C. × 30 s | 140 | 350° C. × 350 s |
| 45 | P | 905 | 51 | 600 | 60 | 860 | 100 | 10 | 7 | 200 | 550° C. × 30 s | 140 | 350° C. × 350 s |
| 46 | Q | 895 | 49 | 600 | 60 | 860 | 100 | 10 | 7 | 288 | 550° C. × 30 s | 138 | 350° C. × 350 s |
| 47 | R | 910 | 52 | 600 | 60 | 860 | 100 | 10 | 7 | 284 | 550° C. × 30 s | 134 | 350° C. × 350 s |
| 48 | S | 918 | 53 | 600 | 60 | 860 | 100 | 10 | 7 | 286 | 550° C. × 30 s | 136 | 350° C. × 350 s |
| 49 | T | 910 | 52 | 600 | 60 | 860 | 100 | 10 | 7 | 282 | 550° C. × 30 s | 132 | 350° C. × 350 s |
| 50 | U | 905 | 51 | 600 | 60 | 860 | 100 | 10 | 7 | 281 | 550° C. × 30 s | 131 | 350° C. × 350 s |
| 51 | V | 920 | 53 | 600 | 60 | 860 | 100 | 10 | 7 | 284 | 550° C. × 30 s | 134 | 350° C. × 350 s |
| 52 | W | 899 | 50 | 600 | 60 | 860 | 100 | 10 | 7 | 282 | 550° C. × 30 s | 132 | 350° C. × 350 s |
| 53 | X | 909 | 52 | 600 | 60 | 860 | 100 | 10 | 7 | 282 | 550° C. × 30 s | 132 | 350° C. × 350 s |
| 54 | Y | 882 | 47 | 600 | 60 | 860 | 100 | 10 | 7 | 286 | 550° C. × 30 s | 136 | 350° C. × 350 s |
| 55 | Z | 885 | 48 | 600 | 60 | 860 | 100 | 10 | 7 | 287 | 550° C. × 30 s | 137 | 350° C. × 350 s |
| 56 | AA | 882 | 47 | 600 | 60 | 860 | 100 | 10 | 7 | 286 | 550° C. × 30 s | 136 | 350° C. × 350 s |
| 57 | AB | 906 | 51 | 600 | 60 | 860 | 100 | 10 | 7 | 282 | 550° C. × 30 s | 132 | 350° C. × 350 s |
| 58 | AC | 913 | 52 | 600 | 60 | 860 | 100 | 10 | 7 | 283 | 550° C. × 30 s | 133 | 350° C. × 350 s |
| 59 | AD | 924 | 54 | 600 | 60 | 860 | 100 | 10 | 7 | 286 | 550° C. × 30 s | 136 | 350° C. × 350 s |
| 60 | AE | 893 | 49 | 600 | 60 | 860 | 100 | 10 | 7 | 285 | 550° C. × 30 s | 135 | 350° C. × 350 s |
| 61 | AF | 919 | 53 | 600 | 60 | 860 | 100 | 10 | 7 | 283 | 550° C. × 30 s | 133 | 350° C. × 350 s |
| 62 | AG | 901 | 50 | 600 | 60 | 860 | 100 | 10 | 7 | 282 | 550° C. × 30 s | 132 | 350° C. × 350 s |
| 63 | AH | 908 | 51 | 600 | 60 | 860 | 120 | 10 | 2.5 | 323 | 550° C. × 30 s | 173 | 330° C. × 400 s |
| 64 | AI | 899 | 50 | 600 | 60 | 860 | 120 | 10 | 2.5 | 305 | 550° C. × 30 s | 155 | 340° C. × 400 s |
| 65 | AJ | 905 | 51 | 600 | 60 | 860 | 120 | 10 | 2.5 | 292 | 550° C. × 30 s | 142 | 350° C. × 400 s |
| 66 | AH | 908 | 51 | 600 | 60 | 860 | 120 | −40 | 2.5 | 304 | 550° C. × 30 s | 154 | 330° C. × 400 s |
| 67 | AI | 899 | 50 | 600 | 60 | 860 | 120 | −40 | 2.5 | 268 | 550° C. × 30 s | 118 | 340° C. × 400 s |
| 68 | AJ | 905 | 51 | 600 | 60 | 860 | 120 | −40 | 2.5 | 292 | 550° C. × 30 s | 142 | 350° C. × 400 s |
| 69 | AK | 910 | 50 | 570 | 55 | 860 | 120 | 10 | 25 | 323 | 550° C. × 30 s | 173 | 350° C. × 350 s |
| 70 | AL | 910 | 50 | 570 | 55 | 860 | 120 | 10 | 25 | 290 | 550° C. × 30 s | 130 | 300° C. × 350 s |
| 71 | AM | 910 | 50 | 570 | 55 | 860 | 120 | 10 | 25 | 270 | 550° C. × 30 s | 110 | 300° C. × 350 s |

\* indicates that conditions do not satisfy those defined by the present invention.

TABLE 4

| Test No. | Steel | Finishing temperature (°C.) | First cooling rate (°C./s) | Coiling temperature (°C.) | Rolling reduction (%) | Maximum annealing temperature (°C.) | Annealing time (s) | Dew point (°C.) | Second cooling rate (°C./s) | Second cooling stopping temperature (°C.) | GA condition | Third cooling stopping temperature (°C.) | Tempering (temperature × time) |
|---|---|---|---|---|---|---|---|---|---|---|---|---|---|
| 72 | a * | 897 | 50 | 600 | 60 | 860 | 100 | 10 | 7 | 341 | 550° C. × 30 s | 191 | 350° C. × 350 s |
| 73 | h * | 918 | 53 | 600 | 60 | 860 | 100 | 10 | 7 | 108 | 550° C. × 30 s | 20 | 350° C. × 350 s |
| 74 | c * | 887 | 48 | 600 | 60 | 860 | 100 | 10 | 7 | 282 | 550° C. × 30 s | 132 | 350° C. × 350 s |
| 75 | d * | 883 | 47 | 600 | | | | | Ruptured during cold rolling | | | | |
| 76 | e * | 913 | 52 | 600 | 60 | 860 | 100 | 10 | 7 | 329 | 550° C. × 30 s | 179 | 350° C. × 600 s |
| 77 | f * | 913 | 52 | 600 | 60 | 860 | 100 | 10 | 7 | 158 | 550° C. × 30 s | 110 | 350° C. × 600 s |
| 78 | g * | 899 | 50 | 600 | 60 | 860 | 100 | 10 | 7 | 256 | 550° C. × 30 s | 106 | 350° C. × 350 s |
| 79 | h * | 897 | 50 | 600 | 60 | 860 | 100 | 10 | 7 | 251 | 550° C. × 30 s | 101 | 350° C. × 350 s |
| 80 | A | 900 | 50 | 600 | 60 | 860 | 120 | 30 | 2.5 | 265 | 550° C. × 30 s | 115 | 350° C. × 400 s |
| 81 | A | 900 | 50 | 600 | 60 | 860 | 120 | 10 | 2.5 | 265 | 550° C. × 30 s | 115 | 350° C. × 400 s |
| 82 | A | 900 | 50 | 600 | 60 | 860 | 120 | 0 | 2.5 | 265 | 550° C. × 30 s | 115 | 350° C. × 400 s |
| 83 | A | 900 | 50 | 600 | 60 | 860 | 120 | −10 | 2.5 | 265 | 550° C. × 30 s | 115 | 350° C. × 400 s |
| 84 | A | 900 | 50 | 600 | 60 | 860 | 120 | −25 | 2.5 | 265 | 550° C. × 30 s | 115 | 350° C. × 400 s |
| 85 | A | 900 | 50 | 600 | 60 | 860 | 120 | −40 | 2.5 | 265 | 550° C. × 30 s | 115 | 350° C. × 400 s |

\* indicates that conditions do not satisfy those defined by the present invention.

Test specimens were taken from the obtained cold-rolled steel sheets. The test specimens were subjected to annealing by being heated to and held at a predetermined temperature, and thereafter were cooled at a predetermined rate (second cooling rate). The highest annealing temperature, the annealing time and the dew point in the annealing step as well as the second cooling rate and the second cooling stopping temperature in the second cooling step are shown collectively in Tables 2 to 4.

Thereafter, isothermal maintenance was performed with respect to some of the test specimens, which were then heated or cooled to 460° C. as a hot-dip plating bath temperature for 5° C./s, and hot-dip galvanizing was performed. Thereafter, an alloying treatment was performed under the GA conditions shown in Table 2 to 4, and subsequently the test specimens were cooled to a third cooling stopping temperature at a rate of 10° C./s (third cooling rate). After cooling, the test specimens were heated at a rate of 10° C./s to perform tempering under the conditions shown in Table 2 to 4, and thereafter were cooled to room temperature at a cooling rate of 10° C./s.

For comparison, galvannealed steel sheets were also prepared under the conventional production conditions shown in Table 5. The conditions were the same as those described above until the cold-rolling step. After the cold-rolling step, the steel sheets were annealed, and thereafter second cooling was performed. Thereafter, the steel sheets were heated at a rate of 10° C./s to the tempering temperature to perform tempering. Thereafter, the temperature was increased directly from that state, and an alloying treatment under the GA conditions shown in Table 5 was performed. Next, the steel sheets were cooled to the third cooling stopping temperature at a rate (third cooling rate) of 10° C./s.

plane of austenite through X-ray analysis using Cu—Kα rays.

$$C\gamma = (\text{lattice constant} - 3.572)/0.033$$

Next, by the method described by F. S. Lepers: Journal of Metals 32, No. 3, (1980) 38-39, a cross section in the rolling direction was etched to reveal fresh martensite and retained austenite. Thereafter, at a position of ¼ thickness of the steel sheet, observation was performed at a magnification of 1000 times using an optical microscope, an obtained micro-structure photograph was subjected to image processing to measure the total area fraction (%) of fresh martensite and retained austenite, and the measured value was taken as the total volume ratio.

Subsequently, the volume ratio of fresh martensite was determined by deducting the volume ratio of retained austenite that was measured by the aforementioned method from the value for the total volume ratio of fresh martensite and retained austenite.

In addition, a cross-section perpendicular to the rolling direction was cut out and mirror polished, and thereafter an electrolytically polished sample was measured by SEM-EBSD at step intervals of 0.1 with respect to a region of 100 μm×100 μm or more. Thereafter, using analysis software produced by TSL solutions Ltd., an average value of the transgranular image quality (Grain Average Image Quality: GAIQ value) for each grain was calculated.

The fraction of grains whose GAIQ value was 5000 or less was taken as the total volume ratio of low-temperature tempered martensite and fresh martensite. The volume ratio of low-temperature tempered martensite was then determined by deducting the volume ratio of fresh martensite from the value for the total volume ratio.

Furthermore, after cutting out a cross-section perpendicular to the rolling direction and mirror polishing the cross-

TABLE 5

| | | | | | | | | | | | | |
|---|---|---|---|---|---|---|---|---|---|---|---|---|
| | | Production conditions | | | | | | | | | | |
| Test No. | Steel | Finishing temperature (° C.) | First cooling rate (° C./s) | Coiling temperature (° C.) | Rolling reduction (%) | Maximum annealing temperature (° C.) | Annealing time (s) | Dew point (° C.) | Second cooling rate (° C./s) | Second cooling stopping temperature (° C.) | Tempering (temperature × time) | GA condition | Third cooling stopping temperature (° C.) |
| 86 | A | 907 | 51 | 600 | 60 | 860 | 100 | 10 | 7 | 160 | 350° C. × 350 s | 600° C. × 30 s | 180 |
| 87 | A | 927 | 55 | 600 | 60 | 860 | 100 | 10 | 7 | 160 | 350° C. × 350 s | 550° C. × 30 s | 180 |
| 88 | A | 924 | 54 | 600 | 60 | 860 | 100 | 10 | 7 | 160 | 350° C. × 350 s | 490° C. × 30 s | 180 |
| 89 | A | 919 | 53 | 600 | 60 | 860 | 100 | 10 | 7 | 160 | 350° C. × 350 s | 470° C. × 30 s | 180 |

Subsequently, observation of the steel micro-structure of the obtained galvannealed steel sheets was performed, and measurement of the volume ratios of the respective micro-structures as well as the C amount in the retained austenite was performed.

The volume ratio (Vγ) of retained austenite was calculated by the following formula based on data obtained using Mo-Kα rays.

$$V\gamma = (\tfrac{2}{3})\{100/(0.7 \times \alpha(111)/\gamma(200)+1)\}$$

$$+ (\tfrac{1}{3})\{100/(0.78 \times \alpha(211)/\gamma(311)+1)\}$$

Where, α(211), γ(200), α(211) and γ(311) represent plane intensity.

Further, the C amount of retained austenite (Cγ) was calculated according to the following formula by determining a lattice constant (unit: angstroms) from the angles of reflection of the (200) plane, the (220) plane, and the (311)

section, etching with nital was performed. SEM observation was then performed with respect to the relevant sample, a fraction of micro-structure having a lath-type structure and containing cementite was determined as the total area fraction of high-temperature tempered martensite and low-temperature tempered martensite, and that value was taken as the total volume ratio. SEM observation was performed at a magnification of 5000 times, in which the measurement region was four or more visual fields of an area of 25 μm×20 μm. The volume ratio of high-temperature tempered martensite was determined by deducting the volume ratio of low-temperature tempered martensite from the aforementioned value.

The total of bainite and tempered martensite was also determined by SEM observation. A region in which a block of bainite or martensite was observed was taken as being bainite or tempered martensite. The total area fraction of bainite and tempered martensite was then measured, and the resulting value was taken as the total volume ratio.

With respect to ferrite and pearlite also, in a similar manner, after performing nital etching, observation using an SEM was performed and a hollowed-out region in which there was no lower micro-structure was taken as ferrite, and a region in which a lamellar micro-structure could be seen was taken as pearlite. The respective area fractions for ferrite and pearlite were determined, and the resulting values were taken as the volume ratios.

Further, the Fe amount contained in the plated layer of each galvannealed steel sheet was measured. Specifically, taking the interface between the hot-dip galvanized layer and the base material as the starting point, the Fe concentration (mass %) in a region from (1/8×plated layer thickness) to (7/8×plated layer thickness) was measured using an energy dispersive X-ray spectroscope (EDX). The average value thereof was then calculated and taken as the Fe amount contained in the plated layer.

In addition, using the respective galvannealed steel sheets, measurement of the thickness of the surface soft layer was performed by the following procedure.

First, a cross-section perpendicular to the rolling direction was cut out and mirror polished. Next, the micro-Vickers hardness was sequentially measured at a pitch of 10 μm from a position that was 10 μm from the interface between the plated layer and the steel sheet to the center of the sheet thickness (position of ½ thickness of the sheet thickness) in the relevant sample. The test force was adjusted in the range of 2 to 25 gf in accordance with the hardness of the micro-structure. Further, in a case where indentations overlapped, measurement was performed by shifting the measurement position in a direction perpendicular to the sheet thickness.

Based on the results of the above measurement, the average hardness in a region from a position of ¼ thickness of the sheet thickness to a position of ½ thickness of the sheet thickness was determined, and a position at which the hardness was 0.9 times the average hardness was identified. A distance from the interface between the plated layer and the steel sheet to the aforementioned position at which the hardness was 0.9 times the average hardness was determined as the thickness of the surface soft layer.

However, in a case where the hardness at a position that was 10 μm from the interface between the plated layer and the steel sheet was more than 0.9 times the average hardness in a region from a position of ¼ thickness of the sheet thickness to a position of ½ thickness of the sheet thickness, the thickness of the surface soft layer was determined by examining changes in the micro-structure fraction by SEM observation.

Specifically, the micro-structure of the outer layer was measured at a magnification of 500 to 1000 times, and the steel micro-structure was observed across an area of 100 to 200 μm in a direction perpendicular to the sheet thickness direction. Next, fractions of the hard micro-structure were respectively determined at positions that were 2, 4, 6, 8 and 10 μm from the interface between the plated layer and the steel sheet. Further, the average fraction of the hard micro-structure in a region from a position of ¼ thickness of the sheet thickness to a position of ½ thickness of the sheet thickness was determined, a position at which the fraction of the hard micro-structure was 0.9 times the aforementioned average fraction was identified, and a distance from that position to the interface between the plated layer and the steel sheet was taken as the thickness of the surface soft layer.

The observation results and measurement results described above are shown collectively in Tables 6 to 9.

TABLE 6

| Test No. | Steel | Micro-structure (vol. %) | | | | | | | | Cγ (%) | Fe amount in plated layer (%) | Thickness of surface soft layer (μm) |
| | | Ferrite | Bainite | Fresh martensite | Pearlite | Retained γ | High-temperature tempered martensite | Low-temperature tempered martensite | Tempered martensite + bainite | | | |
| --- | --- | --- | --- | --- | --- | --- | --- | --- | --- | --- | --- | --- |
| 1 | A | 0 | 23.3 | 1.1 | 0 | 18.6 | 41 | 16 | 80.3 | 1.09 | 10.1 | 78 |
| 2 | A | 0 | 12.3 | 3.0 | 0 | 19.7 | 10 | 55 | 77.3 | 1.07 | 10.1 | 2 |
| 3 | A | 0 | 23.9 | 0.8 | 0 | 17.3 | 30 | 28 | 81.9 | 0.97 | 10.7 | 75 |
| 4 | A | 0 | 25.7 | 1.1 | 0 | 18.2 | 40 | 15 | 80.7 | 1.07 | 10.0 | 76 |
| 5 | A | 0 | 10.2 | 1.9 | 0 | 14.9 | 0 * | 73 | 83.2 | 1.05 | 10.8 | 65 |
| 6 | A | 40 * | 0 | 0 | 60 * | 0 * | 0 * | 0 * | 0.0 * | — | 11.5 | 79 |
| 7 | A | 10 | 21.7 | 1.0 | 12 * | 5.3 * | 10 | 40 | 71.7 | 1.03 | 10.1 | 61 |
| 8 | A | 0 | 25.9 | 2.4 | 0 | 8.7 * | 60 | 2 * | 88.9 | 1.23 | 11.7 | 84 |
| 9 | B | 0 | 21.2 | 2.6 | 0 | 18.2 | 45 | 13 | 79.2 | 1.10 | 10.5 | 86 |
| 10 | B | 0 | 20.0 | 2.0 | 1 | 17.0 | 40 | 20 | 80.0 | 1.10 | 10.1 | 80 |
| 11 | B | 0 | 14.8 | 1.0 | 0 | 16.2 | 25 | 43 | 82.8 | 1.11 | 10.1 | 76 |
| 12 | B | 0 | 12.8 | 0 | 0 | 21.2 | 12 | 54 | 78.8 | 1.10 | 10.5 | 2 |
| 13 | B | 0 | 18.7 | 0 | 0 | 23.3 | 28 | 30 | 76.7 | 1.10 | 11.5 | 67 |
| 14 | B | 0 | 19.4 | 0 | 0 | 20.6 | 27 | 33 | 79.4 | 1.10 | 11.4 | 70 |
| 15 | B | 0 | 20.0 | 0 | 0 | 21.0 | 25 | 34 | 79.0 | 1.10 | 11.8 | 60 |
| 16 | B | 0 | 23.3 | 2.0 | 0 | 16.7 | 39 | 19 | 81.3 | 1.09 | 10.1 | 81 |
| 17 | B | 0 | 0 | 0 | 0 | 3.0 * | 97 | 0 * | 97.0 | 1.12 | 9.7 | 64 |
| 18 | B | 11 | 12.3 | 2.0 | 19 * | 10.9 | 0 * | 45 | 57.1 | 1.05 | 10.0 | 69 |
| 19 | B | 0 | 7.5 | 0 | 0 | 16.5 | 0 * | 76 | 83.5 | 1.09 | 11.2 | 80 |
| 20 | B | 0 | 35.2 | 1.0 | 0 | 8.8 * | 55 | 0 * | 90.2 | 1.10 | 11.2 | 82 |
| 21 | B | 0 | 49.9 | 23.0 * | 0 | 5.1 * | 22 | 0 * | 71.9 | 1.10 | 9.8 | 69 |
| 22 | B | 0 | 47.1 | 20.0 * | 0 | 4.9 * | 28 | 0 * | 75.1 | 1.11 | 9.9 | 70 |
| 23 | C | 0 | 21.5 | 0.8 | 0 | 18.7 | 47 | 12 | 80.5 | 1.12 | 10.6 | 80 |
| 24 | C | 0 | 16.5 | 1.5 | 0 | 19.0 | 10 | 53 | 79.5 | 1.05 | 10.6 | 2 |
| 25 | C | 0 | 9.2 | 1.2 | 0 | 16.6 | 0 * | 73 | 82.2 | 1.07 | 10.1 | 85 |
| 26 | C | 0 | 28.9 | 1.0 | 0 | 20.1 | 38 | 32 | 78.9 | 1.04 | 2.8 | 68 |
| 27 | C | 8 | 17.8 | 0.2 | 16 * | 6.0 * | 8 | 44 | 69.8 | 1.00 | 12.9 | 71 |
| 28 | D | 0 | 20.8 | 0.9 | 0 | 18.3 | 53 | 15 | 88.8 | 1.09 | 11.4 | 72 |
| 29 | D | 0 | 18.2 | 0.3 | 0 | 16.5 | 15 | 50 | 83.2 | 1.09 | 10.1 | 0 |
| 30 | D | 0 | 43.1 | 3.8 | 0 | 15.1 | 25 | 13 | 81.1 | 1.06 | 11.4 | 67 |

TABLE 6-continued

| | | Micro-structure (vol. %) | | | | | | | | | Fe amount in plated layer (%) | Thickness of surface soft layer (μm) |
|---|---|---|---|---|---|---|---|---|---|---|---|---|
| Test No. | Steel | Ferrite | Bainite | Fresh martensite | Pearlite | Retained γ | High-temperature tempered martensite | Low-temperature tempered martensite | Tempered martensite + bainite | Cγ (%) | | |
| 31 | D | 0 | 33.7 | 38.0 * | 0 | 5.3 * | 20 | 3 * | 56.7 | 0.89 | 10.8 | 64 |
| 32 | D | 0 | 45.0 | 0 | 0 | 5.0 * | 18 | 32 | 95.0 | 1.09 | 10.0 | 75 |
| 33 | E | 0 | 24.4 | 0.6 | 0 | 16.0 | 23 | 36 | 83.4 | 1.06 | 11.9 | 79 |
| 34 | F | 0 | 22.3 | 1.7 | 0 | 23.0 | 26 | 27 | 75.3 | 1.09 | 12.5 | 79 |
| 35 | G | 0 | 26.0 | 0.6 | 0 | 15.4 | 28 | 30 | 84.0 | 1.12 | 11.8 | 69 |
| 36 | G | 0 | 30.2 | 0.6 | 0 | 15.2 | 27 | 27 | 84.2 | 1.10 | 11.3 | 70 |

* indicates that conditions do not satisfy those defined by the present invention.

TABLE 7

| | | Micro-structure (vol. %) | | | | | | | | | Fe amount in plated layer (%) | Thickness of surface soft layer (μm) |
|---|---|---|---|---|---|---|---|---|---|---|---|---|
| Test No. | Steel | Ferrite | Bainite | Fresh martensite | Pearlite | Retained γ | High-temperature tempered martensite | Low-temperature tempered martensite | Tempered martensite + bainite | Cγ (%) | | |
| 37 | H | 0 | 25.8 | 0.2 | 0 | 19.0 | 31 | 24 | 80.8 | 1.07 | 11.4 | 65 |
| 38 | I | 0 | 34.9 | 0.8 | 0 | 17.3 | 26 | 21 | 81.9 | 1.21 | 11.7 | 68 |
| 39 | J | 0 | 25.1 | 2.1 | 0 | 25.8 | 24 | 23 | 72.1 | 1.00 | 11.1 | 81 |
| 40 | K | 0 | 33.1 | 0.8 | 0 | 20.1 | 25 | 21 | 79.1 | 1.08 | 11.8 | 71 |
| 41 | L | 0 | 26.4 | 0.6 | 0 | 18.0 | 24 | 31 | 81.4 | 1.09 | 11.6 | 71 |
| 42 | M | 0 | 12.6 | 1.2 | 0 | 19.2 | 38 | 29 | 79.6 | 1.06 | 10.7 | 82 |
| 43 | N | 0 | 14.0 | 1.5 | 0 | 20.5 | 54 | 10 | 78.0 | 1.11 | 11.0 | 79 |
| 44 | O | 0 | 15.0 | 1.1 | 0 | 18.9 | 49 | 16 | 80.0 | 1.05 | 10.0 | 84 |
| 45 | P | 0 | 20.1 | 0.2 | 0 | 16.7 | 48 | 15 | 83.1 | 1.07 | 10.7 | 71 |
| 46 | Q | 0 | 23.6 | 0.2 | 0 | 22.2 | 31 | 25 | 77.6 | 1.09 | 11.2 | 65 |
| 47 | R | 0 | 27.1 | 0.9 | 0 | 22.0 | 28 | 22 | 77.1 | 1.08 | 11.1 | 70 |
| 48 | S | 4 | 16.0 | 1.7 | 0 | 25.3 | 21 | 32 | 69.0 | 1.10 | 12.0 | 65 |
| 49 | T | 3 | 16.5 | 0.2 | 0 | 19.3 | 27 | 34 | 77.5 | 1.12 | 11.2 | 80 |
| 50 | U | 7 | 17.7 | 1.0 | 0 | 20.3 | 27 | 27 | 71.7 | 1.12 | 11.7 | 75 |
| 51 | V | 0 | 16.1 | 0.7 | 0 | 24.2 | 32 | 27 | 75.1 | 1.11 | 11.7 | 74 |
| 52 | W | 0 | 18.3 | 0.6 | 0 | 23.1 | 31 | 27 | 76.3 | 1.08 | 11.7 | 73 |
| 53 | X | 0 | 16.6 | 0.2 | 0 | 21.2 | 27 | 35 | 78.6 | 1.13 | 11.5 | 70 |
| 54 | Y | 0 | 21.8 | 1.0 | 0 | 20.2 | 28 | 29 | 78.8 | 1.21 | 11.1 | 71 |
| 55 | Z | 0 | 24.9 | 1.0 | 0 | 21.1 | 30 | 23 | 77.9 | 1.13 | 11.4 | 82 |
| 56 | AA | 0 | 20.8 | 0.9 | 0 | 22.3 | 33 | 23 | 76.8 | 1.13 | 11.5 | 68 |
| 57 | AB | 0 | 22.6 | 0.4 | 0 | 21.0 | 30 | 26 | 78.6 | 1.03 | 11.8 | 70 |
| 58 | AC | 0 | 17.7 | 0.1 | 0 | 24.2 | 31 | 27 | 75.7 | 1.16 | 12.0 | 72 |
| 59 | AD | 0 | 17.2 | 0.2 | 0 | 20.6 | 23 | 39 | 79.2 | 1.12 | 11.6 | 71 |
| 60 | AE | 0 | 17.1 | 0.5 | 0 | 22.4 | 21 | 39 | 77.1 | 1.10 | 11.4 | 71 |
| 61 | AF | 0 | 22.2 | 0.6 | 0 | 21.2 | 32 | 24 | 78.2 | 1.10 | 11.0 | 70 |
| 62 | AG | 0 | 28.7 | 1.0 | 0 | 23.3 | 29 | 18 | 75.7 | 1.31 | 11.3 | 79 |
| 63 | AH | 0 | 12.5 | 0.8 | 0 | 13.8 | 27 | 46 | 85.5 | 1.13 | 11.3 | 84 |
| 64 | AI | 0 | 23.6 | 1.0 | 0 | 14.4 | 32 | 29 | 84.6 | 1.12 | 11.6 | 71 |
| 65 | AJ | 0 | 35.3 | 0.8 | 0 | 17.9 | 23 | 23 | 81.3 | 1.11 | 11.9 | 49 |
| 66 | AH | 0 | 16.0 | 0.5 | 0 | 12.5 | 25 | 46 | 87.0 | 1.14 | 11.0 | 2 |
| 67 | AI | 0 | 20.5 | 1.1 | 0 | 14.4 | 24 | 40 | 84.5 | 1.11 | 10.5 | 2 |
| 68 | AJ | 0 | 33.0 | 1.0 | 0 | 15.0 | 27 | 24 | 84.0 | 1.13 | 10.5 | 2 |
| 69 | AK | 0 | 31.6 | 1.2 | 0 | 12.2 | 32 | 23 | 86.6 | 1.13 | 11.3 | 46 |
| 70 | AL | 13 | 28.0 | 1.5 | 0 | 13.5 | 22 | 22 | 72.0 | 1.25 | 11.3 | 55 |
| 71 | AM | 12 | 24.0 | 1.2 | 0 | 16.8 | 22 | 24 | 70.0 | 1.19 | 11.5 | 44 |

* indicates that conditions do not satisfy those defined by the present invention.

TABLE 8

| Test No. | Steel | Ferrite | Bainite | Fresh martensite | Pearlite | Retained γ | High-temperature tempered martensite | Low-temperature tempered martensite | Tempered martensite + bainite | Cγ (%) | Fe amount in plated layer (%) | Thickness of surface soft layer (μm) |
|---|---|---|---|---|---|---|---|---|---|---|---|---|
| 72 | a * | 0 | 24.9 | 1.0 | 0 | 11.1 | 30 | 33 | 87.9 | 1.08 | 10.3 | 59 |
| 73 | b * | 0 | 13.1 | 9.6 | 0 | 65.1 * | 10 | 2.2 * | 25.3 * | 0.99 | 9.7 | 63 |
| 74 | c * | 0 | 41.3 | 0.4 | 0 | 0.3 * | 35 | 23 | 99.3 | unmeasurable | 11.3 | 75 |
| 75 | d * | | | | | Ruptured during manufacturing | | | | | | |
| 76 | e * | 10 | 18.6 | 0.7 | 5.2 | 6.5 * | 25 | 34 | 77.6 | 1.25 | 11.3 | 73 |
| 77 | f * | 0 | 0 | 12.0 * | 0 | 20.6 | 30 | 19 | 49.0 | 0.83 | 9.8 | 71 |
| 78 | g * | 0 | 17.8 | 14.9 * | 0 | 18.3 | 33 | 16 | 66.8 | 0.81 | 10.3 | 71 |
| 79 | h * | 0 | 22.0 | 15.7 * | 0 | 18.3 | 31 | 13 | 66.0 | 0.83 | 10.6 | 77 |
| 80 | A | 0 | 33.5 | 1.0 | 0 | 19.5 | 26 | 20 | 79.5 | 1.10 | 11.9 | 87 |
| 81 | A | 0 | 36.4 | 1.1 | 0 | 18.5 | 21 | 23 | 80.4 | 1.09 | 11.5 | 73 |
| 82 | A | 0 | 30.8 | 1.0 | 0 | 23.2 | 23 | 22 | 75.8 | 1.08 | 10.8 | 51 |
| 83 | A | 0 | 29.2 | 1.4 | 0 | 21.5 | 29 | 19 | 77.2 | 1.11 | 10.5 | 13 |
| 84 | A | 0 | 25.1 | 1.0 | 0 | 20.9 | 26 | 27 | 78.1 | 1.10 | 10.3 | 4 |
| 85 | A | 0 | 32.9 | 0.8 | 0 | 21.3 | 20 | 25 | 77.9 | 1.09 | 10.1 | 0 |

* indicates that conditions do not satisfy those defined by the present invention.

TABLE 9

| Test No. | Steel | Ferrite | Bainite | Fresh martensite | Pearlite | Retained γ | High-temperature tempered martensite | Low-temperature tempered martensite | Tempered martensite + bainite | Cγ (%) | Fe amount in plated layer (%) | Thickness of surface soft layer (μm) |
|---|---|---|---|---|---|---|---|---|---|---|---|---|
| 86 | A | 0 | 10.9 | 5.0 | 12 * | 5.1 * | 67 | 0 * | 77.9 | 0.89 | 10.3 | 77 |
| 87 | A | 0 | 11.4 | 3.0 | 11 * | 7.8 * | 67 | 0 * | 78.4 | 0.98 | 10.7 | 81 |
| 88 | A | 0 | 12.7 | 2.2 | 1.2 | 16.9 | 67 | 0 * | 79.7 | 1.01 | 4.5 | 73 |
| 89 | A | 0 | 12.7 | 0.8 | 0 | 19.5 | 67 | 0 * | 79.7 | 1.09 | 2.5 | 75 |

* indicates that conditions do not satisfy those defined by the present invention.

Next, measurement of the mechanical properties of the obtained galvannealed steel sheets was performed. From the respective test specimens which had undergone a heat treatment, a JIS No. 5 tensile test specimen was taken in a manner such that a direction perpendicular to the rolling direction and width direction became the tensile direction, and the yield strength (YS), tensile strength (TS), uniform elongation (uEL), and total elongation (tEL) were measured. Further, a difference between the total elongation and the uniform elongation was taken as the local elongation (lEL).

Further, evaluation of the fatigue characteristics was performed using each galvannealed steel sheet. The fatigue limit was measured by plane-bending fatigue test using a HS No. 1 test specimen. A value of −1 was adopted as the stress ratio, and 25 Hz was adopted as the repetition frequency. First, for each steel sheet, a fatigue test was performed by applying stress of an amount equivalent to 0.6 times the tensile strength. As a result, all of the steel sheets ruptured at a number of repetitions that was less than $2 \times 10^6$ times, and therefore the same fatigue test was repeatedly performed by lowering the applied stress in amounts of 20 MPa each time from the initially applied stress amount. Subsequently, when a stress at which rupturing did not occur after $2 \times 10^6$ repetitions was reached, the stress was raised by 10 MPa and a test was performed. If rupturing still did not occur at that stress value the stress was raised by 5 MPa and a test was performed, while if rupturing occurred the stress was lowered by 5 MPa and a test was performed. The maximum stress at which rupturing did not occur when the maximum number of repetitions was set to $2 \times 10^6$ times in the fatigue tests performed according to the aforementioned procedure was taken as the fatigue limit.

In addition, evaluation of liquid metal embrittlement cracking resistance was performed by the following procedure using the respective galvannealed steel sheets.

Two steel sheets of the same kind were stacked on top of each other and joined together by spot welding, and a cross-section at the joint was observed with an SEM to examine the state of liquid metal embrittlement cracking. The spot welding was performed at a welding angle of 5° with respect to the two stacked steel sheet using a Cr—Cu electrode. As the conduction pattern, using a power source of 50 Hz and an applied pressure of 250 to 750 kgf, a conduction pattern was adopted that applied a current so that a nugget diameter was 5.5 to 6.0 mm for 40 cycles.

The state of liquid metal embrittlement cracking was performed by polishing a steel sheet cross-section containing nuggets, performing observation with an SEM, and evaluating the degree of cracking with the following cracking score.

1: Cracking occurs on the inside of the plate set, and the crack length is more than 10 μm.

2: Although cracking occurs on the inside of the plate set, the crack length is 10 μm or less.

3: Cracking propagates as far as a nugget, or cracking occurs on the outside of the plate set at a position that is separated by 300 μm from a nugget.

4: Cracking occurs only between a surface portion of the steel sheet that the electrode contacted and a nugget.

5: There is no cracking.

The measurement results for the mechanical properties as well as the evaluation results for fatigue characteristics and liquid metal embrittlement cracking resistance are shown in Tables 10 to 13.

TABLE 10

| Test No. | Steel | YS (MPa) | TS (MPa) | uEL (%) | tEL (%) | lEL (%) | TS × uEL (MPa %) | TS × lEL (MPa %) | TS × tEL (MPa %) | YR | Fatigue limit/TS | Cracking score | |
|---|---|---|---|---|---|---|---|---|---|---|---|---|---|
| 1 | A | 1039 | 1499 | 14.8 | 19.1 | 4.3 | 22185 | 6446 | 28631 | 0.69 | 0.29 | 5 | Inventive |
| 2 | A | 1198 | 1534 | 14.1 | 18.8 | 4.7 | 21629 | 7210 | 28839 | 0.78 | 0.49 | 1 | example |
| 3 | A | 970 | 1488 | 13.9 | 18.3 | 4.4 | 20683 | 6547 | 27230 | 0.65 | 0.23 | 5 | |
| 4 | A | 1041 | 1500 | 14.3 | 19.0 | 4.7 | 21450 | 7050 | 28500 | 0.69 | 0.30 | 5 | |
| 5 | A | 1183 | 1490 | 8.2 | 17.9 | 4.7 | 12218 * | 7003 | 26671 | 0.79 | 0.26 | 5 | Comparative |
| 6 | A | 798 | 918 * | 9.1 | 16.5 | 7.4 | 8354 * | 6793 | 15147 | 0.87 | 0.25 | 5 | example |
| 7 | A | 1100 | 1328 * | 8.9 | 15.0 | 6.1 | 11819 * | 8101 | 19920 | 0.83 | 0.26 | 5 | |
| 8 | A | 1292 | 1450 * | 8.2 | 14.0 | 5.8 | 11934 * | 8338 | 20271 | 0.89 | 0.28 | 5 | |
| 9 | B | 1049 | 1496 | 15.2 | 20.7 | 5.5 | 22739 | 8228 | 30967 | 0.70 | 0.26 | 5 | Inventive |
| 10 | B | 1049 | 1486 | 16.0 | 21.0 | 5.0 | 23776 | 7430 | 31206 | 0.71 | 0.24 | 5 | example |
| 11 | B | 1100 | 1490 | 14.9 | 20.2 | 5.3 | 22201 | 7897 | 30098 | 0.74 | 0.26 | 5 | |
| 12 | B | 1175 | 1543 | 14.2 | 17.7 | 3.5 | 21911 | 5401 | 27311 | 0.76 | 0.48 | 1 | |
| 13 | B | 1135 | 1500 | 15.2 | 18.7 | 3.5 | 22845 | 5265 | 28110 | 0.76 | 0.23 | 5 | |
| 14 | B | 1104 | 1477 | 15.2 | 19.1 | 3.9 | 22436 | 5746 | 28181 | 0.75 | 0.30 | 5 | |
| 15 | B | 1071 | 1499 | 15.7 | 19.6 | 4.0 | 23474 | 5966 | 29440 | 0.71 | 0.37 | 5 | |
| 16 | B | 1053 | 1439 | 15.3 | 20.5 | 5.2 | 22782 | 7743 | 30525 | 0.71 | 0.24 | 5 | |
| 17 | B | 1350 | 1683 | 4.0 | 8.0 | 4.0 | 6732 * | 6732 | 13464 | 0.80 | 0.24 | 5 | Comparative |
| 18 | B | 999 | 1370 * | 7.8 | 12.9 | 4.1 | 10686 * | 5617 | 17673 | 0.73 | 0.25 | 5 | example |
| 19 | B | 1186 | 1473 | 8.0 | 17.8 | 3.5 | 11784 * | 5156 | 26219 | 0.81 | 0.25 | 5 | |
| 20 | B | 983 | 1370 * | 8.2 | 15.2 | 7.0 | 11234 * | 9590 | 20824 | 0.72 | 0.25 | 5 | |
| 21 | B | 780 | 1650 | 8.5 | 10.8 | 2.3 | 14025 | 3795 * | 17820 | 0.47 | 0.24 | 5 | |
| 22 | B | 779 | 1649 | 8.4 | 10.9 | 2.5 | 13852 | 4123 * | 17974 | 0.47 | 0.25 | 5 | |
| 23 | C | 1038 | 1488 | 14.9 | 19.3 | 4.4 | 22171 | 6547 | 28718 | 0.70 | 0.25 | 5 | Inventive |
| 24 | C | 1101 | 1553 | 14.0 | 18.9 | 4.9 | 21742 | 7610 | 29352 | 0.71 | 0.50 | 1 | example |
| 25 | C | 1100 | 1498 | 7.5 | 18.9 | 4.7 | 11235 * | 7041 | 28312 | 0.73 | 0.23 | 5 | Comparative |
| 26 | C | 1112 | 1510 | 14.8 | 18.7 | 3.9 | 22348 | 5889 | 28237 | 0.74 | 0.22 | 5 | example |
| 27 | C | 906 | 1303 * | 9.0 | 14.8 | 5.8 | 11727 * | 7557 | 19284 | 0.70 | 0.25 | 5 | |
| 28 | D | 1051 | 1492 | 15.1 | 20.0 | 5.0 | 22529 | 7460 | 29840 | 0.70 | 0.25 | 5 | Inventive |
| 29 | D | 1163 | 1571 | 13.7 | 18.2 | 4.5 | 21523 | 7070 | 28592 | 0.74 | 0.52 | 1 | example |
| 30 | D | 1000 | 1490 | 14.2 | 17.6 | 3.4 | 21158 | 5066 | 26224 | 0.67 | 0.26 | 5 | |
| 31 | D | 833 | 1622 | 4.8 | 7.2 | 2.4 | 7786 * | 3893 * | 11678 | 0.51 | 0.25 | 5 | Comparative |
| 32 | D | 1201 | 1490 | 5.0 | 7.7 | 2.7 | 7450 * | 4023 * | 11473 | 0.81 | 0.25 | 5 | example |
| 33 | E | 1207 | 1489 | 15.6 | 20.2 | 4.6 | 23184 | 6894 | 30078 | 0.81 | 0.32 | 5 | Inventive |
| 34 | F | 1133 | 1583 | 14.8 | 18.6 | 3.8 | 23476 | 5952 | 29428 | 0.72 | 0.27 | 5 | example |
| 35 | G | 1110 | 1479 | 13.5 | 18.2 | 4.7 | 20026 | 6907 | 26933 | 0.75 | 0.31 | 5 | |
| 36 | G | 1105 | 1552 | 13.4 | 18.0 | 4.6 | 20797 | 7139 | 27936 | 0.71 | 0.31 | 5 | |

* indicates that conditions do not satisfy those defined by the present invention.

TABLE 11

| Test No. | Steel | YS (MPa) | TS (MPa) | uEL (%) | tEL (%) | lEL (%) | TS × uEL (MPa %) | TS × lEL (MPa %) | TS × tEL (MPa %) | YR | Fatigue limit/TS | Cracking score | |
|---|---|---|---|---|---|---|---|---|---|---|---|---|---|
| 37 | H | 1145 | 1522 | 15.3 | 19.9 | 4.6 | 23351 | 6926 | 30277 | 0.75 | 0.29 | 5 | Inventive |
| 38 | I | 1160 | 1491 | 15.4 | 19.7 | 4.2 | 22991 | 6322 | 29313 | 0.78 | 0.29 | 5 | example |
| 39 | J | 1130 | 1489 | 14.3 | 18.8 | 4.5 | 21293 | 6700 | 27993 | 0.76 | 0.32 | 5 | |
| 40 | K | 1092 | 1534 | 14.6 | 19.2 | 4.6 | 22442 | 6980 | 29422 | 0.71 | 0.24 | 5 | |
| 41 | L | 1113 | 1533 | 14.8 | 18.9 | 4.1 | 22627 | 6316 | 28943 | 0.73 | 0.34 | 5 | |
| 42 | M | 1203 | 1500 | 13.7 | 19.1 | 5.4 | 20550 | 8100 | 28650 | 0.80 | 0.23 | 5 | |
| 43 | N | 1181 | 1514 | 14.1 | 17.9 | 3.8 | 21347 | 5753 | 27101 | 0.78 | 0.25 | 5 | |
| 44 | O | 1109 | 1521 | 14.1 | 19.2 | 5.1 | 21446 | 7757 | 29203 | 0.73 | 0.26 | 5 | |
| 45 | P | 1168 | 1544 | 14.0 | 18.7 | 4.7 | 21616 | 7257 | 28873 | 0.76 | 0.23 | 5 | |
| 46 | Q | 1145 | 1486 | 15.2 | 19.2 | 4.3 | 22528 | 6063 | 28591 | 0.77 | 0.29 | 5 | |
| 47 | R | 1170 | 1486 | 15.4 | 19.1 | 3.7 | 22855 | 5528 | 28383 | 0.79 | 0.24 | 5 | |
| 48 | S | 1083 | 1480 | 15.8 | 20.0 | 4.2 | 23310 | 6216 | 29526 | 0.73 | 0.29 | 5 | |
| 49 | T | 1036 | 1477 | 13.8 | 18.4 | 4.6 | 20427 | 6779 | 27206 | 0.70 | 0.29 | 5 | |
| 50 | U | 950 | 1486 | 16.5 | 20.0 | 3.5 | 24445 | 5231 | 29675 | 0.64 | 0.36 | 5 | |
| 51 | V | 1160 | 1477 | 15.1 | 20.8 | 5.7 | 22347 | 8419 | 30766 | 0.79 | 0.32 | 5 | |
| 52 | W | 1156 | 1488 | 15.2 | 20.4 | 5.2 | 22558 | 7723 | 30281 | 0.78 | 0.31 | 5 | |
| 53 | X | 1156 | 1482 | 13.9 | 18.5 | 4.6 | 20600 | 6773 | 27373 | 0.78 | 0.33 | 5 | |
| 54 | Y | 1171 | 1495 | 15.3 | 20.0 | 4.8 | 22814 | 7101 | 29915 | 0.78 | 0.33 | 5 | |
| 55 | Z | 1148 | 1494 | 14.2 | 18.1 | 3.9 | 21230 | 5752 | 26982 | 0.77 | 0.24 | 5 | |

TABLE 11-continued

| Test No. | Steel | YS (MPa) | TS (MPa) | uEL (%) | tEL (%) | lEL (%) | TS × uEL (MPa %) | TS × lEL (MPa %) | TS × tEL (MPa %) | YR | Fatigue limit/TS | Cracking score |
|---|---|---|---|---|---|---|---|---|---|---|---|---|
| 56 | AA | 1149 | 1501 | 15.3 | 18.9 | 3.6 | 22920 | 5419 | 28339 | 0.77 | 0.27 | 5 |
| 57 | AB | 1163 | 1507 | 14.2 | 17.9 | 3.8 | 21354 | 5666 | 27021 | 0.77 | 0.26 | 5 |
| 58 | AC | 1147 | 1509 | 13.4 | 17.7 | 4.3 | 20221 | 6459 | 26679 | 0.76 | 0.25 | 5 |
| 59 | AD | 1178 | 1520 | 14.0 | 18.7 | 4.7 | 21234 | 7190 | 28424 | 0.78 | 0.23 | 5 |
| 60 | AE | 1153 | 1488 | 15.2 | 18.8 | 3.6 | 22647 | 5342 | 27989 | 0.77 | 0.29 | 5 |
| 61 | AF | 1129 | 1478 | 15.1 | 18.8 | 3.7 | 22303 | 5424 | 27727 | 0.76 | 0.31 | 5 |
| 62 | AG | 1048 | 1511 | 15.7 | 20.7 | 5.0 | 23753 | 7585 | 31338 | 0.69 | 0.29 | 5 |
| 63 | AH | 1113 | 1484 | 9.7 | 18.8 | 9.1 | 14454 | 13430 | 27884 | 0.75 | 0.25 | 5 |
| 64 | AI | 1041 | 1477 | 12.4 | 19.9 | 7.6 | 18241 | 11181 | 29422 | 0.70 | 0.32 | 5 |
| 65 | AJ | 1005 | 1484 | 14.1 | 20.1 | 6.0 | 20850 | 8904 | 29754 | 0.68 | 0.29 | 5 |
| 66 | AH | 1197 | 1522 | 9.8 | 18.6 | 8.9 | 14855 | 13470 | 28324 | 0.79 | 0.55 | 1 |
| 67 | AI | 1072 | 1540 | 12.2 | 19.2 | 7.1 | 18726 | 10872 | 29599 | 0.70 | 0.53 | 1 |
| 68 | AJ | 1046 | 1559 | 13.3 | 19.1 | 5.9 | 20672 | 9151 | 29824 | 0.67 | 0.55 | 1 |
| 69 | AK | 1100 | 1498 | 9.3 | 18.3 | 9.0 | 13931 | 13482 | 27413 | 0.73 | 0.26 | 5 |
| 70 | AL | 1056 | 1476 | 12.3 | 18.7 | 6.4 | 18155 | 9446 | 27601 | 0.72 | 0.29 | 5 |
| 71 | AM | 1045 | 1490 | 14.2 | 18.8 | 4.6 | 21158 | 6854 | 28012 | 0.70 | 0.29 | 5 |

* indicates that conditions do not satisfy those defined by the present invention.

TABLE 12

| Test No. | Steel | YS (MPa) | TS (MPa) | uEL (%) | tEL (%) | lEL (%) | TS × uEL (MPa %) | TS × lEL (MPa %) | TS × tEL (MPa %) | YR | Fatigue limit/TS | Cracking score | |
|---|---|---|---|---|---|---|---|---|---|---|---|---|---|
| 72 | a * | 1151 | 1370 * | 15.8 | 21.2 | 5.4 | 21616 | 7398 | 29044 | 0.84 | 0.28 | 5 | Comparative |
| 73 | b * | 700 | | | Ruptured during tension test (C rupture) | | | | | | | 1 | example |
| 74 | c * | 1050 | 1350 * | 7.9 | 13.4 | 5.5 | 10665 * | 7425 | 18090 | 0.78 | 0.20 | 5 | |
| 75 | d * | | | | Ruptured during manufacturing | | | | | | | | |
| 76 | e * | 1133 | 1290 * | 14.6 | 18.8 | 4.2 | 18834 | 5418 | 24252 | 0.88 | 0.27 | 5 | |
| 77 | f * | 720 | 1680 | 12.9 | 14.1 | 1.2 | 21672 | 2016 * | 23688 | 0.43 | 0.22 | 5 | |
| 78 | g * | 778 | 1600 | 14.8 | 15.8 | 1.0 | 23680 | 1600 * | 25280 | 0.49 | 0.26 | 5 | |
| 79 | h * | 760 | 1653 | 14.1 | 15.2 | 1.1 | 23307 | 1818 * | 25126 | 0.46 | 0.27 | 5 | |
| 80 | A | 1025 | 1488 | 15.3 | 20.8 | 5.5 | 22766 | 8199 | 30965 | 0.69 | 0.26 | 5 | Inventive |
| 81 | A | 1064 | 1506 | 15.9 | 20.5 | 4.6 | 23930 | 6882 | 30813 | 0.71 | 0.25 | 5 | example |
| 82 | A | 1041 | 1506 | 14.9 | 20.1 | 5.2 | 22439 | 7846 | 30286 | 0.69 | 0.27 | 5 | |
| 83 | A | 1055 | 1515 | 15.2 | 20.2 | 5.0 | 23058 | 7499 | 30558 | 0.70 | 0.38 | 4 | |
| 84 | A | 1078 | 1515 | 15.3 | 19.7 | 4.4 | 23225 | 6651 | 29876 | 0.71 | 0.55 | 3 | |
| 85 | A | 1096 | 1535 | 15.5 | 19.5 | 4.0 | 23793 | 6171 | 29963 | 0.71 | 0.52 | 1 | |

* indicates that conditions do not satisfy those defined by the present invention.

TABLE 13

| Test No. | Steel | YS (MPa) | TS (MPa) | uEL (%) | tEL (%) | lEL (%) | TS × uEL (MPa %) | TS × lEL (MPa %) | TS × tEL (MPa %) | YR | Fatigue limit/TS | Cracking score | |
|---|---|---|---|---|---|---|---|---|---|---|---|---|---|
| 86 | A | 730 | 1186 * | 8.2 | 11.3 | 4.1 | 9725 * | 4863 * | 14588 | 0.62 | 0.24 | 5 | Comparative |
| 87 | A | 790 | 1339 * | 8.5 | 12.3 | 3.8 | 11382 * | 5088 | 16470 | 0.59 | 0.23 | 5 | example |
| 88 | A | 1030 | 1450 * | 8.5 | 14.9 | 6.4 | 12325 * | 9280 | 21605 | 0.71 | 0.21 | 5 | |
| 89 | A | 1030 | 1453 * | 13.8 | 18.2 | 4.4 | 20051 | 6393 | 26445 | 0.71 | 0.20 | 5 | |

* indicates that conditions do not satisfy those defined by the present invention.

In Test Nos. 1 to 4, 9 to 16, 23, 24, 28 to 30, 33 to 71 and 80 to 85 that are example embodiments of the present invention, it was found that the TS was more than 1470 MPa, the product of tensile strength and uniform elongation was 13000 MPa % or more, the product of tensile strength and local elongation was 5000 MPa % or more, the formability was excellent, and adequate alloying had been performed in the plated layer.

In contrast, in Test Nos. 5, 18, 19 and 25, because the second cooling stopping temperature was high, high-temperature tempered martensite was not obtained, and the product of the tensile strength and uniform elongation was low. In Test No. 6, because the highest annealing temperature was low, a large amount of ferrite-pearlite transformation occurred, and the tensile strength was low. In Test No. 7, because the second cooling rate was slow, pearlite transformation occurred during cooling and hence the retained austenite fraction was low, and the product of the tensile strength and uniform elongation was low.

In Test No. 8, because the time period of the tempering was long and retained austenite decomposed to bainite containing carbides, the retained austenite amount was small and the product of tensile strength and uniform elongation was low. In Test No. 17, because the second cooling stopping temperature was low and a large amount of martensite transformation proceeded at that temperature, almost no austenite remained, and the product of the tensile strength and uniform elongation was low.

In Test No. 20, because the tempering temperature was high and austenite decomposed into bainite containing carbides, the amount of retained austenite was small and the product of the tensile strength and uniform elongation was low. In Test No. 21, the tempering temperature was low, and in Test No. 22 tempering was not performed, and consequently in each of these tests C did not concentrate into austenite and the amount of fresh martensite was large, and therefore the product of the tensile strength and local elongation was low.

In Test No. 26, although the steel sheet was excellent in mechanical properties, alloying of the plated layer was insufficient because the alloying temperature was low. In Test No. 27, because the alloying temperature was high and a large amount of pearlite was formed, the retained austenite fraction was low, and the product of the tensile strength and uniform elongation was low.

In Test No. 31, the third cooling stopping temperature was high, the tempered martensite amount was small, and further, thereafter bainite transformation did not progress. Consequently, C did not concentrate into austenite and ultimately fresh martensite formed, and therefore the product of the tensile strength and uniform elongation and the product of the tensile strength and local elongation were both low. Further, in Test No. 32, because the third cooling stopping temperature was low and martensite was formed in a large amount at that time point and the amount of austenite decreased, the product of the tensile strength and uniform elongation and the product of the tensile strength and local elongation were both low.

In Test No. 72, the C content was lower than the defined range, and the tensile strength was low. In Test No. 73, the C content was higher than the defined range and the retained austenite was excessive, and the steel sheet ruptured immediately after the start of the tension test. In Test No. 74, the Si content was lower than the defined range and retained austenite could not be secured, and the product of the tensile strength and uniform elongation was low.

In Test No. 75, the Si content was higher than the defined range, and the steel sheet ruptured during cold rolling. In Test No. 76, the Mn content was lower than the defined range, pearlite transformation progressed during the second cooling, and retained austenite could not be secured, and hence the tensile strength was low. In Test Nos. 77 to 79, the contents of Mn, Cr and Mo, respectively, were higher than the defined range, and therefore bainite transformation did not progress, C did not concentrate into austenite, and martensite remained in a large amount, and therefore the product of the tensile strength and local elongation was low.

Test Nos. 86 to 89 are examples in which alloying treatment was performed after tempering in accordance with the conventional method. In Test Nos. 86 and 87, although alloying progressed because the alloying temperature was sufficient, the volume ratio of retained austenite and low-temperature tempered martensite was low, and the tensile strength and the product of the tensile strength and uniform elongation were low. In Test No. 88 also, although alloying progressed to a certain extent, the volume ratio of low-temperature tempered martensite was low, and the tensile strength and the product of the tensile strength and uniform elongation were low. In Test No. 89, because the alloying temperature was low, in addition to alloying being insufficient, the volume ratio of low-temperature tempered martensite was low, and hence the tensile strength was low. Thus, according to the conventional method, it was difficult to compatibly achieve both a strength-ductility balance and adequate alloying.

In addition, in the example embodiments of the present invention, in Test Nos. 2, 12, 24, 29, 66 to 68, 84 and 85 in which the dew point in the annealing step was made −25° C. or less, the thickness of the surface soft layer was 10 μm or less, the ratio of the fatigue limit to the tensile strength was high, and consequently the fatigue characteristics were excellent.

On the other hand, in Test Nos. 1, 3, 4, 9 to 11, 13 to 16, 23, 28, 30, 33 to 65, 69 to 71 and 80 to 83 in which the dew point in the annealing step was made −10° C. or more, the thickness of the surface soft layer was more than 10 pin, the cracking score was 4 or more, and consequently the liquid metal embrittlement cracking resistance was excellent.

INDUSTRIAL APPLICABILITY

According to the present invention, it is possible to obtain a galvannealed steel sheet that is excellent in uniform deformability (uniform elongation) and local deformability (local elongation) while having high tensile strength of 1470 MPa or more.

The invention claimed is:

1. A galvannealed steel sheet comprising an alloyed hot-dip galvanized layer on a surface of a steel sheet,
a chemical composition of the steel sheet consisting of, by mass %,
C: 0.25 to 0.70%,
Si: 0.25 to 2.50%,
Mn: 1.00 to 5.00%,
Al: 0.005 to 3.50%,
P: 0.15% or less,
S: 0.03% or less,
N: 0.02% or less,
O: 0.01% or less,
Ti: 0 to 0.50%,
Nb: 0 to 0.50%,
V: 0 to 0.50%,
Cr: 0 to 1.50%,
Mo: 0 to 1.50%,
Cu: 0 to 5.00%,
Ni: 0 to 5.00%,
B: 0 to 0.003%,
Ca: 0 to 0.05%,
REM: 0 to 0.05%,
Mg: 0 to 0.05%,
W: 0 to 0.50%,
Zr: 0 to 0.05%,
Sb: 0 to 0.50%,
Sn: 0 to 0.50%,
As: 0 to 0.05%,
Te: 0 to 0.05%,
Y: 0 to 0.20%,
Hf: 0 to 0.20%,
Co: 0 to 1.00%, and
a balance: Fe and impurities,
wherein:
a steel micro-structure at a position of ¼ thickness of a sheet thickness is, by vol. %, retained austenite: 10.0 to 60.0%,
high-temperature tempered martensite: 5.0% or more,
low-temperature tempered martensite: 5.0% or more,
fresh martensite: 10.0% or less,
ferrite: 0 to 15.0%,
pearlite: 0 to 10.0%, and
a balance: bainite; and
a total volume ratio of high-temperature tempered martensite, low-temperature tempered martensite and bainite is 30.0% or more,
a tensile strength is 1470 MPa or more,
a product of the tensile strength and uniform elongation is 13000 MPa % or more, and
a product of the tensile strength and local elongation is 5000 MPa % or more.

2. The galvannealed steel sheet according to claim 1, wherein:
the chemical composition contains, by mass %,
Si+Ai: 0.80% or more.

3. The galvannealed steel sheet according to claim 2, wherein:
the steel sheet comprises, in an outer layer, a surface soft layer having a hardness that is not more than 0.9 times an average hardness in a region from a position of ¼ thickness of the sheet thickness to a position of ½ thickness of the sheet thickness; and
a thickness of the surface soft layer from an interface between the alloyed hot-dip galvanized layer and the steel sheet is more than 10 μm.

4. The galvannealed steel sheet according to claim 2, wherein:
the steel sheet comprises, in an outer layer, a surface soft layer having a hardness that is not more than 0.9 times an average hardness in a region from a position of ¼ thickness of the sheet thickness to a position of ½ thickness of the sheet thickness;
a thickness of the surface soft layer from an interface between the alloyed hot-dip galvanized layer and the steel sheet is 10 μm or less; and
a ratio of a fatigue limit to a tensile strength of the steel sheet is 0.30 or more.

5. The galvannealed steel sheet according to claim 1, wherein:
the chemical composition contains, by mass %, one or more elements selected from:
Ti: 0.005 to 0.50%,
Nb: 0.005 to 0.50%,
V: 0.005 to 0.50%,
Cr: 0.01 to 1.50%,
Mo: 0.01 to 1.50%,
Cu: 0.01 to 5.00%,
Ni: 0.01 to 5.00%,
B: 0.0001 to 0.003%,
Ca: 0.0001 to 0.05%,
REM: 0.0005 to 0.05%,
Mg: 0.0001 to 0.05%,
W: 0.005 to 0.50%,
Zr: 0.005 to 0.05%,
Sb: 0.005 to 0.50%,
Sn: 0.005 to 0.50%,
As: 0.005 to 0.05%,
Te: 0.001 to 0.05%,
Y: 0.001 to 0.20%,
Hf: 0.001 to 0.20%, and
Co: 0.001 to 1.00%.

6. The galvannealed steel sheet according to claim 5, wherein:
the steel sheet comprises, in an outer layer, a surface soft layer having a hardness that is not more than 0.9 times an average hardness in a region from a position of ¼ thickness of the sheet thickness to a position of ½ thickness of the sheet thickness; and
a thickness of the surface soft layer from an interface between the alloyed hot-dip galvanized layer and the steel sheet is more than 10 μm.

7. The galvannealed steel sheet according to claim 5, wherein:
the steel sheet comprises, in an outer layer, a surface soft layer having a hardness that is not more than 0.9 times an average hardness in a region from a position of ¼ thickness of the sheet thickness to a position of ½ thickness of the sheet thickness;
a thickness of the surface soft layer from an interface between the alloyed hot-dip galvanized layer and the steel sheet is 10 μm or less; and
a ratio of a fatigue limit to a tensile strength of the steel sheet is 0.30 or more.

8. The galvannealed steel sheet according to claim 1, wherein:
a C amount contained in the retained austenite is 0.85% by mass or more.

9. The galvannealed steel sheet according to claim 8, wherein:
the steel sheet comprises, in an outer layer, a surface soft layer having a hardness that is not more than 0.9 times an average hardness in a region from a position of ¼ thickness of the sheet thickness to a position of ½ thickness of the sheet thickness; and
a thickness of the surface soft layer from an interface between the alloyed hot-dip galvanized layer and the steel sheet is more than 10 μm.

10. The galvannealed steel sheet according to claim 8, wherein:
the steel sheet comprises, in an outer layer, a surface soft layer having a hardness that is not more than 0.9 times an average hardness in a region from a position of ¼ thickness of the sheet thickness to a position of ½ thickness of the sheet thickness;
a thickness of the surface soft layer from an interface between the alloyed hot-dip galvanized layer and the steel sheet is 10 μm or less; and
a ratio of a fatigue limit to a tensile strength of the steel sheet is 0.30 or more.

11. The galvannealed steel sheet according to claim 1, wherein:
an Fe amount contained in the alloyed hot-dip galvanized layer is 3.0 to 20.0% by mass.

12. The galvannealed steel sheet according to claim 11, wherein:
the steel sheet comprises, in an outer layer, a surface soft layer having a hardness that is not more than 0.9 times an average hardness in a region from a position of ¼ thickness of the sheet thickness to a position of ½ thickness of the sheet thickness; and
a thickness of the surface soft layer from an interface between the alloyed hot-dip galvanized layer and the steel sheet is more than 10 μm.

13. The galvannealed steel sheet according to claim 11, wherein:
the steel sheet comprises, in an outer layer, a surface soft layer having a hardness that is not more than 0.9 times an average hardness in a region from a position of ¼ thickness of the sheet thickness to a position of ½ thickness of the sheet thickness;

a thickness of the surface soft layer from an interface between the alloyed hot-dip galvanized layer and the steel sheet is 10 µm or less; and a ratio of a fatigue limit to a tensile strength of the steel sheet is 0.30 or more.

14. The galvannealed steel sheet according to claim 1, wherein:

the steel sheet comprises, in an outer layer, a surface soft layer having a hardness that is not more than 0.9 times an average hardness in a region from a position of ¼ thickness of the sheet thickness to a position of ½ thickness of the sheet thickness; and a thickness of the surface soft layer from an interface between the alloyed hot-dip galvanized layer and the steel sheet is more than 10 µm.

15. The galvannealed steel sheet according to claim 1 wherein:

the steel sheet comprises, in an outer layer, a surface soft layer having a hardness that is not more than 0.9 times an average hardness in a region from a position of ¼ thickness of the sheet thickness to a position of ½ thickness of the sheet thickness;

a thickness of the surface soft layer from an interface between the alloyed hot-dip galvanized layer and the steel sheet is 10 µm or less; and a ratio of a fatigue limit to a tensile strength of the steel sheet is 0.30 or more.

16. A method for producing a galvannealed steel sheet, that is a method for producing a galvannealed steel sheet according to claim 1, comprising:

(a) a melting step of melting an ingot or a slab having a chemical composition consisting of, by mass %,
C: 0.25 to 0.70%,
Si: 0.25 to 2.50%,
Mn: 1.00 to 5.00%,
Al: 0.005 to 3.50%,
P: 0.15% or less,
S: 0.03% or less,
N: 0.02% or less,
O: 0.01% or less,
Ti: 0 to 0.50%,
Nb: 0 to 0.50%,
V: 0 to 0.50%,
Cr: 0 to 1.50%,
Mo: 0 to 1.50%,
Cu: 0 to 5.00%,
Ni: 0 to 5.00%,
B: 0 to 0.003%,
Ca: 0 to 0.05%,
REM: 0 to 0.05%,
Mg: 0 to 0.05%,
W: 0 to 0.50%,
Zr: 0 to 0.05%,
Sb: 0 to 0.50%,
Sn: 0 to 0.50%,
As: 0 to 0.05%,
Te: 0 to 0.05%,
Y: 0 to 0.20%,
Hf: 0 to 0.20%,
Co: 0 to 1.00%, and
a balance: Fe and impurities;

(b) a hot-rolling step of heating the ingot or slab and performing hot-rolling to obtain a hot-rolled steel sheet;

(c) a first cooling step of cooling the hot-rolled steel sheet;

(d) a coiling step of coiling the hot-rolled steel sheet;

(e) a cold-rolling step of uncoiling and pickling the hot-rolled steel sheet, and thereafter performing cold rolling to obtain a cold-rolled steel sheet;

(f) an annealing step of maintaining the cold-rolled steel sheet in a temperature range from an $Ac_1$ point to 920° C. for 5 s or more;

(g) a second cooling step of cooling the cold-rolled steel sheet to a temperature range of 100 to 350° C. at an average cooling rate of 1° C./s or more;

(h) a pre-treatment step of cooling or heating the cold-rolled steel sheet to a hot-dip galvanizing bath temperature;

(i) a plating step of immersing the cold-rolled steel sheet in a hot-dip galvanizing bath such that the steel sheet is hot-dip galvanized to obtain a hot-dip galvanized steel sheet;

(j) an alloying step of heating the hot-dip galvanized steel sheet to 480 to 600° C. such that the hot-dip galvanized steel sheet is alloyed to obtain a galvannealed steel sheet;

(k) a third cooling step of cooling the galvannealed steel sheet to a temperature range of 80 to 300° C. at an average cooling rate of 1° C./s or more; and (l) a tempering step of maintaining the galvannealed steel sheet in a temperature range from 100 to 450° C. for 1 s or more and 48 h or less;

wherein the steps from (a) to (l) are carried out in sequence.

17. A method for producing a galvannealed steel sheet, that is a method for producing a galvannealed steel sheet according to claim 14, comprising:

(a) a melting step of melting an ingot or a slab having a chemical composition consisting of, by mass %,
C: 0.25 to 0.70%,
Si: 0.25 to 2.50%,
Mn: 1.00 to 5.00%,
Al: 0.005 to 3.50%,
P: 0.15% or less,
S: 0.03% or less,
N: 0.02% or less,
O: 0.01% or less,
Ti: 0 to 0.50%,
Nb: 0 to 0.50%,
V: 0 to 0.50%,
Cr: 0 to 1.50%,
Mo: 0 to 1.50%,
Cu: 0 to 5.00%,
Ni: 0 to 5.00%,
B: 0 to 0.003%,
Ca: 0 to 0.05%,
REM: 0 to 0.05%,
Mg: 0 to 0.05%,
W: 0 to 0.50%,
Zr: 0 to 0.05%,
Sb: 0 to 0.50%,
Sn: 0 to 0.50%,
As: 0 to 0.05%,
Te: 0 to 0.05%,
Y: 0 to 0.20%,
Hf: 0 to 0.20%,
Co: 0 to 1.00%, and
a balance: Fe and impurities;

(b) a hot-rolling step of heating the ingot or slab and performing hot-rolling to obtain a hot-roiled steel sheet;

(c) a first cooling step of cooling the hot-rolled steel sheet;

(d) a coiling step of coiling the hot-rolled steel sheet;

(e) a cold-roiling step of uncoiling and pickling the hot-rolled steel sheet, and thereafter performing cold rolling to obtain a cold-rolled steel sheet;

(f) an annealing step of maintaining the cold-rolled steel sheet in a temperature range from an $Ac_1$ point to 920° C. for 5 s or more in an atmosphere with a dew point of 25° C. or more;

(g) a second cooling step of cooling the cold-rolled steel sheet to a temperature range of 100 to 350° C. at an average cooling rate of 1° C./s or more;

(h) a pre-treatment step of cooling or heating the cold-rolled steel sheet to a hot-dip galvanizing bath temperature;

(i) a plating step of immersing the cold-rolled steel sheet in a hot-dip galvanizing bath such that the steel sheet is hot-dip galvanized to obtain a hot-dip galvanized steel sheet;

(j) an alloying step of heating the hot-dip galvanized steel sheet to 480 to 600° C. such that the hot-dip galvanized steel sheet is alloyed to obtain a galvannealed steel sheet;

(k) a third cooling step of cooling the galvannealed steel sheet to a temperature range of 80 to 300° C. at an average cooling rate of 1° C./s or more; and (l) a tempering step of maintaining the galvannealed steel sheet in a temperature range from 100 to 450° C. for 1 s or more and 48 h or less;

wherein the steps from (a) to (l) are carried out in sequence.

18. A method for producing a galvannealed steel sheet, that is a method for producing a galvannealed steel sheet according to claim 15, comprising:

(a) a melting step of melting an ingot or a slab having a chemical composition consisting of, by mass %, C: 0.25 to 0.70%,
Si: 0.25 to 2.50%,
Mn: 1.00 to 5.00%,
Al: 0.005 to 3.50%,
P: 0.15% or less,
S: 0.03% or less,
N: 0.02% or less,
O: 0.01% or less,
Ti: 0 to 0.50%,
Nb: 0 to 0.50%,
V: 0 to 0.50%,
Cr: 0 to 1.50%,
Mo: 0 to 1.50%,
Cu: 0 to 5.00%,
Ni: 0 to 5.00%,
B: 0 to 0.003%,
Ca: 0 to 0.05%,
REM: 0 to 0.05%,
Mg: 0 to 0.05%,
W: 0 to 0.50%,
Zr: 0 to 0.05%,
Sb: 0 to 0.50%,
Sn: 0 to 0.50%,
As: 0 to 0.05%,
Te: 0 to 0.05%,
Y: 0 to 0.20%,
Hf: 0 to 0.20%,
Co: 0 to 1.00%, and
a balance: Fe and impurities;

(b) a hot-rolling step of heating the ingot or slab and performing hot-rolling to obtain a hot-rolled steel sheet;

(c) a first cooling step of cooling the hot-rolled steel sheet;

(d) a coiling step of coiling the hot-rolled steel sheet;

(e) a cold-rolling step of uncoiling and pickling the hot-rolled steel sheet, and thereafter performing cold rolling to obtain a cold-rolled steel sheet;

(f) an annealing step of maintaining the cold-rolled steel sheet in a temperature range from an Act point to 920° C. for 5 s or more in an atmosphere with a dew point of −15° C. or less;

(g) a second cooling step of cooling the cold-rolled steel sheet o a temperature range of 100 to 350° C. at an average cooling rate of 1° C./s or more;

(h) a pre-treatment step of cooling or heating the cold-rolled steel sheet to a hot-dip galvanizing bath temperature;

(i) a plating step of immersing the cold-rolled steel sheet in a hot-dip galvanizing bath such that the steel sheet is hot-dip galvanized to obtain a hot-dip galvanized steel sheet;

(j) an alloying step of heating the hot-dip galvanized steel sheet to 480 to 600° C. such that the hot-dip galvanized steel sheet is alloyed to obtain a galvannealed steel sheet;

(k) a third cooling step of cooling the galvannealed steel sheet to a temperature range of 80 to 300° C. at an average cooling rate of or more; and (l) a tempering step of maintaining the galvannealed steel sheet in a temperature range from 100 to 450° C. for 1 s or more and 48 h or less;

wherein the steps from (a) to (l) are carried out in sequence.

\* \* \* \* \*

UNITED STATES PATENT AND TRADEMARK OFFICE
CERTIFICATE OF CORRECTION

PATENT NO. : 10,745,775 B2
APPLICATION NO. : 15/580002
DATED : August 18, 2020
INVENTOR(S) : Sano et al.

It is certified that error appears in the above-identified patent and that said Letters Patent is hereby corrected as shown below:

On the Title Page

Item (57), In the Abstract, Line 3:
"0.005 to 3.50%, P: 0.15% or less, S: 0.03% or less, N £"
Should read:
"0.005 to 3.50%, P: 0.15% or less, S: 0.03% or less, N $\leq$"

Item (57), In the Abstract, Line 4:
"0.02%, O £ 0.01%, and optionally one or more selected from"
Should read:
"0.02%, O $\leq$ 0.01%, and optionally one or more selected from"

Item (57), In the Abstract, Line 8:
"60.0%, high-temperature tempered martensite³ 5.0%, low-"
Should read:
"60.0%, high-temperature tempered martensite $\geq$ 5.0%, low-"

Item (57), In the Abstract, Line 9:
"temperature tempered martensite³ 5.0%, fresh martensite £"
Should read:
"temperature tempered martensite $\geq$ 5.0%, fresh martensite $\leq$"

In the Specification

Column 44, Line 65:
performing hot-rolling to obtain a hot-roiled steel sheet;
Should read:
"performing hot-rolling to obtain a hot-rolled steel sheet;"

Signed and Sealed this
Fifteenth Day of December, 2020

Andrei Iancu
*Director of the United States Patent and Trademark Office*

CERTIFICATE OF CORRECTION (continued)
U.S. Pat. No. 10,745,775 B2

Column 45, Line 1:
"(e) a cold-roiling step of uncoiling and pickling the"
Should read:
"(e) a cold-rolling step of uncoiling and pickling the"

Column 45, Line 7:
"of 25° C. or more;"
Should read:
"of -25° C. or more;"

Column 46, Line 23:
"sheet in a temperature range from an Act point to 920°"
Should read:
"sheet in a temperature range from an $Ac_1$ point to 920°"

Column 46, Line 27:
"sheet o a temperature range of 100 to 350° C. at an"
Should read:
"sheet to a temperature range of 100 to 350° C. at an"

Column 46, Line 42:
"average cooling rate of or more; and"
Should read:
"average cooling rate of 1° C./s or more; and"